United States Patent [19]
Akasu

[11] Patent Number: 5,699,151
[45] Date of Patent: Dec. 16, 1997

[54] DISTANCE MEASUREMENT DEVICE

[75] Inventor: Masahira Akasu, Himeji, Japan

[73] Assignee: Mitsubishi Denki Kabushiki Kaisha, Tokyo, Japan

[21] Appl. No.: 494,769

[22] Filed: Jun. 26, 1995

[30] Foreign Application Priority Data

Jun. 28, 1994 [JP] Japan .................................. 6-146480

[51] Int. Cl.⁶ .................................................. G01C 3/08
[52] U.S. Cl. ................................. 356/5.01; 356/5.05
[58] Field of Search ............................. 356/5.01, 5.05

[56] References Cited

U.S. PATENT DOCUMENTS

| | | | |
|---|---|---|---|
| 4,605,302 | 8/1986 | Löfgren et al. | 356/5 |
| 4,657,382 | 4/1987 | Busujima et al. | 356/4 |
| 4,699,507 | 10/1987 | Etoh | 356/5 |
| 5,102,218 | 4/1992 | Min et al. | 356/5 |
| 5,179,286 | 1/1993 | Akasu | 356/5 X |
| 5,243,181 | 9/1993 | Bondarev et al. | 250/214 B |
| 5,504,590 | 4/1996 | Akasu | 356/5.05 |
| 5,523,835 | 6/1996 | Tanaka | 356/5.05 |

FOREIGN PATENT DOCUMENTS

| | | |
|---|---|---|
| 0269902 | 6/1988 | European Pat. Off. . |
| 2224175 | 4/1990 | United Kingdom . |
| 2263036 | 7/1993 | United Kingdom . |
| 2269504 | 2/1994 | United Kingdom . |
| 2274368 | 7/1994 | United Kingdom . |
| 2275146 | 8/1994 | United Kingdom . |
| 2276998 | 10/1994 | United Kingdom . |

OTHER PUBLICATIONS

U.S. Appln. SN 08/189,713, filed Feb. 1, 1994, GAU 2505, Masahira Akasu.

*Primary Examiner*—Mark Hellner
*Attorney, Agent, or Firm*—Sughrue,Mion,Zinn,Macpeak & Seas, PLLC

[57] ABSTRACT

A distance measurement device comprising a light-sending unit for sending pulsed light toward an object of measurement where a distance thereto is measured, a light-receiving unit for receiving incident light including pulsed reflection light reflected by the object, a distance measurement unit for measuring the time from the sending of the pulsed light to the receiving of the incident light and calculating the distance to the object, and an interference detection unit for determining whether interference light exists in the incident light, based on the intensity of the incident light.

27 Claims, 18 Drawing Sheets

(a) CLOCK PULSE (b) DISTANCE MEASUREMENT PERIOD (c) INTERFERENCE LIGHT

DISTANCE MEASUREMENT DEVICE

BACKGROUND OF THE INVENTION

1. Field of the Invention

The present invention relates to a distance measurement device which sends pulsed light toward an object of measurement where a distance thereto is measured, receives light reflected by the object, and measures the time required from the sending of light to the receiving of light to obtain the distance to the object.

2. Description of the Related Art

A distance measurement device of the above kind is shown in FIG. 29. In the figure, the distance measurement device comprises clock pulse generation means 1, light-sending means 2, a plus drive unit 21, a laser diode 22 that is driven by the pulse drive unit 21, and a light-sending lens 23. Light-receiving means 3 consists of a light-receiving lens 31 and a light-receiving element 32. And, distance measurement means 4 obtains a distance to an object 10 which is an object of measurement.

Next, the operation of the conventional device thus constructed will be described. The clock pulse generation means 1 generates a clock pulse CP which is a reference. The light-sending means 2 drives the pulse drive unit 21 to generate a drive pulse DP in synchronization with the clock pulse CP that the clock pulse generation means 1 generates, and then drives the laser diode 22 to generate pulsed light A. The pulsed light A generated by the laser diode 22 is irradiated forward as a pulsed light beam B that is condensed by the light-sending lens 23. This irradiated light beam B will be reflected by the object 10 if the object is within a range of the irradiation. This reflection light E reflected by the object 10 is incident on the light-receiving lens 31 of the light-receiving means 3 as incident light G and is condensed at the light-receiving surface of a light-receiving element 32 as focused light H. The light-receiving element (a photoelectron converter) 32 converts the focused light H into a light reception signal J.

The above-described distance measurement means 4 compares the light reception signal J from the light-receiving element 32 with a predetermined threshold value and detects the significant light reception signal J based on the reflection light E from the object 10. Further, the distance measurement means 4 measures, from the clock pulse CP, i.e., the time of occurrence (ta) of the drive pulse DP of the laser diode of the light-sending means 2 and the time of detection (tb) of the light reception signal J based on the reflection light E from the above-described object 10, the turnaround time to the object 10 (t=tb−ta) by using, for example, a high frequency oscillator and a high speed counter, and obtains the distance between the distance measurement device and the object, d, by the following Equation (1):

$$d = t \times c/2 \qquad \text{(Equation 1)}$$

where c represents the speed of light.

In summary, instead of the drive pulse and the light reception signal which are electric signals, the above-described time, t (=tb−ta), is modified to the time from the sending of the pulsed light A to the incidence of the focused light H and is substituted into Equation (1).

Also, the distance measurement means 4 is constructed so that it calculates a distance based the first significant light reception signal J and would not calculate a distance even if other significant light reception signals were between the first distance calculation and the next distance calculation.

A distance measurement device such as described above detects the distance to the object 10 by sending the light beam B to the object 10 and receiving the light E reflected from the object 10. However, if interference light S, such as pulsed light from other light sources or pulsed reflection light therefrom, is incident on the light-receiving means 3 as incident light G before the reflection light E from the object 10 is incident, the light-receiving means 3 cannot determine whether the light incident thereon is the reflection light E from the object 10 based on the light beam B sent by the light-receiving means 3 or the interference light S from other light sources, so the interference light S from other light sources is recognized as reflection light E by mistake. And, the distance measurement means 4 performs a distance measurement calculation with the light reception signal J based on the interference light S and will calculate a mistaken distance d (Equation 1).

The above-described problem of the incidence of the interference light S from other light sources occurs when a plurality of distance measurement devices of the above kind are used. For example, this kind of distance measurement device is mounted in a vehicle and utilized as a device which measures the distance between vehicles and alarms to maintain a safe distance between vehicles. And, if two opposite vehicles traveling on two opposite lanes are provided with similar devices, the pulsed light of the distance measurement device of the opposite vehicle will surely be incident on the distance measurement device of a self-vehicle as interference light S.

Since the interference light S from the opposite vehicle is direct light, even if the opposite vehicle were far away, the level (illuminance) of the incident light to the light-receiving means 3 would be far stronger than that of the reflection light E from a normal preceding vehicle. At this time, if the reflection light E from the distance measurement device of a self-vehicle and the pulsed interference light S from the distance measurement device of the opposite vehicle occur at the substantially same time, the interference light S from the opposite vehicle will be detected by mistake, so an alarm is to be given even when there is no preceding vehicle on the same lane as a self-vehicle.

Thus, the mistaken operation caused by receiving the interference light S other than the regular light E reflected from the object 10 becomes an important problem associated with the safety and reliability of a system, when this kind of device is used in a sensor of a system for controlling an alarm occurrence or equipment.

Also, when the interference light S of the distance measurement device of an opposite vehicle is received, conversely the pulsed light A of the distance measurement device of a self-vehicle is also irradiated to the opposite vehicle. Therefore, since the driver of the opposite vehicle is also subjected to the irradiation of the pulsed light A, the conventional device is undesirable from the standpoint of safety.

SUMMARY OF THE INVENTION

This invention has been made to solve problems such as described above. Accordingly, it is an object of the present invention to provide a distance measurement device which is capable of judging whether interference light exists in the light incident on light-receiving means.

Another object of the present invention is to provide a distance measurement device which does not use mistaken distance measurement data caused by the incidence of interference light, which is capable of making a normal measurement while preventing a mistaken measurement of distances even if there were the incidence of interference light from other distance measurement devices, and which is capable of making as small as possible an influence on other distance measurement devices which are light sources of interference light.

Still another object of the present invention is to provide a distance measurement device which is capable of raising the safety to persons who are using other distance measurement devices which are light sources of interference light, for example, the driver of an automobile.

According to one aspect of this invention, there is provided a distance measurement device comprising:

light-receiving means for receiving incident light including pulsed reflection light reflected by the object;

distance measurement means for measuring the time from the sending of the pulsed light to the receiving of the incident light and calculating the distance to the object; and interference detection means for determining whether interference light exists in the incident light, based on the intensity of the incident light.

When interference light exists in incident light, the interference light has the property that, as compared with the reflection light reflected by an object of measurement, the intensity is greater and a fluctuation in the intensity is small, and that incident light exists even after the distance measurement time equivalent to the distance measurable range in which time data is measured. Therefore, with the above-described arrangement, whether interference light exists in incident light can be determined based on the property described above. And, if it can be determined that interference light exists in incident light, it is also possible to take an appropriate measure according to that.

In a preferred form of the invention, the interference detection means determines whether interference light exists in the incident light, by comparing the intensity of the incident light with a predetermined value.

With this arrangement, interference light is incident from a light source directly on the light-receiving means, so it is reduced in inverse proportion to (distance)$^2$, and the reflection light reflected by a measured object is attenuated in inverse proportion to (distance)$^4$. Therefore, the intensity of the interference light is much greater than that of the reflection light, and when the intensity of the incident light is greater than a predetermined value, it can be determined that interference light exists in incident light.

In another preferred form of the invention, the interference detection means determines whether interference light exists in the incident light, by comparing the intensity of the incident light with a set value preset according to a distance.

With this arrangement, interference light is incident from a light source directly on the light-receiving means, so it is reduced in inverse proportion to (distance)$^2$, and the reflection light reflected by a measured object is attenuated in inverse proportion to (distance)$^4$. Therefore, if a set value is set so that it is great for a short distance, small for a long distance, and inversely proportional to (distance)$^2$ or (distance)$^4$, even weak interference light can be determined with reliability.

In a further preferred form of the invention, the interference detection means stores a plurality of distance data measured by the distance measurement means and a plurality of intensity data of incident light corresponding to the plurality of distance data, and determines whether interference light exists in the incident light, based on fluctuations in the distance data and the intensity data of the incident light.

Pulsed light which becomes interference light is not sent in synchronization with the light-sending means. Therefore, when the incident light includes interference light, a fluctuation in the distance data calculated based on that incident light becomes greater. On the other hand, a fluctuation in the intensity data of incident light is small. As a result, when the fluctuation in the distance data is great and the fluctuation in the intensity data of incident light is great, it can be determined that interference light exists in the incident light.

Further, when various objects of measurement are measured, the fluctuations in the distance data and the intensity of incident light are both great. Therefore, in such case, it may be determined that interference light does not exist in the incident light.

In a further preferred form of the invention, the interference detection means determines whether interference light exists in the incident light, by detecting from the pulsed light sent by the light-sending means the intensity of incident light after a distance measurement time equivalent to a distance measurable range of the distance measurement means.

In this arrangement, when incident light of more than a predetermined intensity exists after a distance measurement time equivalent to a distance measurable range, the incident light can be determined to be interference light.

According to another aspect of the invention, there is provided a distance measurement device comprising:

distance measurement means for measuring the time from the sending of the pulsed light to the receiving of the incident light including the pulsed light reflected by the object and calculating the distance to the object; and interference detection means for determining whether interference light exists in the incident light, by comparing the time or the distance with a predetermined value.

In this arrangement, when the measured time from the sending of pulsed light to the receiving of the pulsed light is more than a distance measurement time equivalent to the distance measurable range of the distance measurement means, or the measured time is greater than the distant measurable range, this is because of interference light. Therefore, it can be determined whether interference light exists in incident light, by comparing the above-described time or distance with a predetermined value.

According to a further aspect of the invention, there is provided a distance measurement device comprising:

light-receiving means for receiving incident light including pulsed reflection light reflected by the object;

distance measurement means for measuring the time from the sending of the pulsed light to the receiving of the incident light to obtain time data and calculating the distance to the object to obtain distance data; and interference detection means for determining whether interference light exists in the incident light, by detecting, from excess time data which exceeds a predetermined time among the time data, the periodicity of the excess time data.

In this arrangement, the time data from the sending of the pulsed light obtained from reflection light to the receiving of the pulsed light does not exceed the time equivalent to the distance measurement range of the distance measurement means. Therefore, among a plurality of time data from the sending of pulsed light to the receiving of the pulsed light, the excess time data, which exceeds a predetermined time more than a distance measurement time equivalent to the distance measurable range of the distance measurement means, is based on interference light. Further, if periodicity exists, it can be determined that the excess time data was obtained due to other device periodically generating pulsed light.

In a preferred form of the invention, the device according to the invention further comprises data invalidation means for calculating, based on the incident timing and occurrence period of incident light when determined as interference light by the interference detection means, a chance that the interference light overlaps the pulsed reflection light, and for making invalid distance data obtained when the interference light overlaps the pulsed reflection light.

In this arrangement, if interference light has a periodicity, the data invalidation means calculates, based on the incident timing and occurrence period of incident light, a chance that the interference light overlaps the pulsed reflection light, so the distance data obtained when the interference light overlaps the pulsed reflection light can be made invalid. As a result, there is no possibility that distance data is recognized by mistake.

According to a further aspect of the invention, there is provided a distance measurement device comprising:

light-sending means for sending pulsed light toward an object of measurement where a distance thereto is measured, at the light-sending timing synchronized with a clock pulse;

light-receiving means for receiving incident light including pulsed reflection light reflected by the object;

distance measurement means for measuring the time from the sending of the pulsed light to the receiving of the incident light and calculating the distance to the object;

light-sending stop means for stopping the sending of the pulsed light at least by the next light-sending timing after the distance measurement by the distance measurement means; and interference detection means for determining whether interference light exists in the incident light, based on incident light that is incident on the light-receiving means between the next light-sending timing at which the sending of the pulsed light is stopped by the light-sending stop means and the next after the next light-sending timing at which the sending of the pulsed light is restarted.

In this arrangement, the light-sending stop means stops the sending of the pulsed light at least by the next light-sending timing and the next following light-sending timing after the distance measurement by the distance measurement means. There is no reflection light from a measured object during this stop of the sending of light. Therefore, if there is incident light that is incident on the light-receiving means during this period, the incident light will be interference light. Also, when the difference between the intensity of the incident light at the time of a previous distance measurement and the intensity of the incident light during a present stop of the light sending is small, the incident light is also interference light. Further, when the incident light between the next timing at which the sending of light is stopped and a plurality of light-sending timings at which the sending of light is stopped, has a periodicity, the incident light is interference light. Therefore, whether interference light exists in incident light can be determined by whether the incident light has these properties.

In another preferred form of the invention, the interference detection means determines that interference light exists in incident light, when the incident light is incident on the light-receiving means between the next light-sending timing at which the sending of the pulsed light is stopped by the light-sending stop means and the next after the next light-sending timing at which the sending of the pulsed light is restarted.

There is no reflection light from a measured object during the time the sending of light is stopped. Therefore, when there is incident light that is incident on the light-receiving means during this period, it can be determined that interference light exists in the incident light.

In a further preferred form of the invention, the interference detection means stores as intensity data of incident light the intensity of incident light of the light-receiving means obtained at the time of the distance measurement of the distance measurement means, compares the intensity data of the incident light with the intensity of incident light that is incident on the light-receiving means between the next light-sending timing at which the sending of the pulsed light is stopped by the light-sending stop means and the next after the next light-sending timing at which the sending of the pulsed light is restarted, and determines whether interference light exists in incident light.

In this arrangement, when the difference between the intensity of the incident light at the time of a previous distance measurement and the intensity of the incident light during a present stop of the light sending is small, the present stop of the light sending will not have an influence on the incident light. Therefore, the incident light which is not influenced by the stop of the light sending is interference light, and the incident light at the time of the previous and prevent distance measurements is also interference light, so it can be determined that the result of the previous distance measurement is a mistaken measurement.

In a further preferred form of the invention, the light-sending stop means stops the sending of the pulsed light, and the interference light detection means determines whether interference light exists in incident light, based on whether there is the periodicity of incident light that is incident on the light-receiving means between the next light-sending timing at which the sending of the pulsed light is stopped by the light-sending stop means and the next after the next light-sending timing at which the sending of the pulsed light is restarted.

In this arrangement, the sending of the pulsed light is stopped at a plurality of light-sending timings, and if the incident light during this stop has a periodicity, it can be determined that the incident light is light that is sent by other devices periodically generating pulsed light.

According to a further aspect of the invention, there is provided a distance measurement device comprising:

light-receiving means for receiving incident light including pulsed reflection light reflected by the object;

distance measurement means for measuring the time from the sending of the pulsed light to the receiving of the incident light and calculating the distance to the object; and interference detection means for storing the intensity of the pulsed light and the intensity of the incident light as intensity data of the pulsed light and intensity data of the incident light, and for determining whether interference light exists in the incident light, based on the intensity data of the pulsed light and the intensity data of the incident light as the output of the pulsed light is changed by the light-sending output control means.

In this arrangement; the output of the sent pulsed light is in proportion to the intensity of the pulsed reflection light reflected by an object of measurement. Therefore, if the intensity of the incident light changes when the output of the sent pulsed light is changed, the incident light is reflection light. On the other hand, if the intensity of the incident light does not change, the incident light can be determined to be interference light. As a result, whether interference light exists in incident light can be determined based on the intensity of pulsed light to be sent and based on the intensity of reflection light.

In a preferred form of the invention, the interference detection means determines that interference light does not exist in incident light, when the intensity of the incident light is increased and decreased as the intensity of the pulsed light is increased and decreased.

In this arrangement, the output of the sent pulsed light is in proportion to the intensity of the pulsed reflection light reflected by an object of measurement. Therefore, if the intensity of incident light is increased when the output of the sent pulsed light is increased, and is decreased when the output of the sent pulsed light is reduced, the incident light is reflection light. On the other hand, if a change in the intensity of the incident light is small when the output of the sent pulsed light is increased and decreased, it can be determined that interference light exists in the incident light.

According to a further aspect of the invention, there is provided a distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by the object;

distance measurement means for measuring the time from the sending of the pulsed light to the receiving of the incident light and calculating the distance to the object in the each scanning direction as distance data; and interference detection means for determining whether interference light exists in the reflection light, based on the intensity data and distance data of the incident light.

In this arrangement, distance data to be measured by scanning is measured several times while changing the place on the object of measurement little by little, and the fluctuation in the distance data is small. Also, since reflection light is reflected by the same object, the fluctuation in the intensity of the incident light is small and that intensity is small as compared with interference light. On the other hand, when incident light is interference light, the interference light is not sent in synchronization with the light-sending timing of the light-sending means of the device of the present invention, so there is a high possibility that the timing at which the interference light is incident on the light-sending means becomes random, and also a fluctuation in the distance data calculated based on this becomes greater. Therefore, whether interference light exists can be determined based on the intensity of incident light and the characteristic of distance data.

In a preferred form of the invention, the interference detection means determines whether interference light exists in the incident light, based on a fluctuation in distance data in one scan.

In this arrangement, distance data to be measured by scanning is measured several times while changing the place on the object of measurement little by little, and since the same object is to be measured continuously, the fluctuation in the distance data becomes small. On the other hand, when incident light is interference light, the interference light is not sent in synchronization with the light-sending timing of the light-sending means of the device of the present invention, so there is a high possibility that the timing at which the interference light is incident on the light-sending means becomes random. Therefore, it can be determined that when the fluctuation in the distance data is small, there is no interference light, and when the fluctuation is great, there is interference light.

In another preferred form of the invention, the interference detection means determines whether interference light exists in the incident light, by calculating, for each direction, a fluctuation in distance data obtained by a plurality of scans.

In a scan type device, the same object of measurement is usually scanned several times. Therefore, the fluctuation in the distance data in the same direction obtained by a plurality of scans should be small. If the fluctuation in the distance data in a particular direction obtained by a plurality of scans is great, the distance data will not be distance data calculated based on reflection light from the same object of measurement. That is, it can be determined that distance data is based on interference light.

In a further preferred form of the invention, the interference detection means determines whether interference light exists in reflection light, based on intensity or distance data of incident light in an end of horizontal scan and in the vicinity of the central portion, among distance data obtained by a plurality of scans.

In general, the device in this arrangement slowly comes closer to a far object of measurement, and the intensity of the reflection light becomes greater as the device comes closed to the object. Also, there is the characteristic that a vehicle passing ahead appears from the opposite ends of a horizontal scan at all times. Therefore: when the intensity of incident light or distance data does not change at the opposite ends of the horizontal scan but it abruptly changes in the vicinity of the central portion during scan, it can be determined that the abrupt change is because of interference light.

In a further preferred form of the invention, the scan light-sending means stops the sending of the pulsed light for a predetermined time during scan, and the interference detection means determines whether interference light exists in the incident light, based on incident light that is incident on the light-receiving means during the stop of the sending of the pulsed light.

In this arrangement, reflection light that is reflected from an object of measurement by the sent light does not exist during the time the sending of light is stopped. Therefore, when incident light exists during this, it can be determined that interference light exists in the incident light.

In a further preferred form of the invention, the scan light-sending means stops the sending of the pulsed light during a return of scan, and the interference detection means determines whether interference light exists in the incident light, based on incident light; that is incident on the light-receiving means during the stop of the sending of the pulsed light.

In this arrangement, since the scan light-sending means stops the sending of the pulsed light during a return of scan, the time during the return can effectively be utilized.

According to a further aspect of the invention, there is provided a distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by the object;

distance measurement means for calculating, based on the time from the sending of the pulsed light to the receiving of the incident light and based on the scanning direction, a direction of the incident light and also the distance to the object in the direction of the incident light as distance data; and interference detection means for determining whether interference light exists in the incident light, based on a direction of light that is incident from a range of acceptance angle covering the scan range of the scan light-sending means and based on the direction of the incident light.

With this arrangement, the interference detection means detects the direction of light that is incident from the scan range of the scan light-sending means. Therefore, when this detected direction and the direction of the incident light by the distance measurement means correspond to each other, it can be determined that interference light does not exist in incident light.

In a preferred form of the invention, the distance measurement device according to the present invention further comprises data invalidation means for making invalid distance data corresponding to an incident direction of interference light, when the interference detection means determines that the interference light exists in incident light.

With this arrangement, the data invalidation means makes invalid distance data corresponding to an incident direction of interference light, when the interference detection means determines that the interference light exists in incident light. Therefore, there is no possibility that the measurement distance data based on interference light is recognized as correct distance data by mistake.

According to a further aspect of the invention, there is provided a distance measurement device comprising:

scan light-sending means for sending pulsed light toward an object of measurement where a distance thereto is measured, while scanning a predetermined range in a one-dimensional or two-dimensional direction;

light-receiving means which has a predetermined directivity and receives incident light including pulsed reflection light reflected in each scanning direction by the object;

distance measurement means for calculating, based on the time from the sending of the pulsed light to the receiving of the incident light and based on the scanning direction, a direction of the incident light and also the distance to the object in the direction of the incident light as distance data; and interference detection means which has a second predetermined directivity different from the predetermined directivity of the light-receiving means, scans the scan range to receive second incident light not including the pulsed reflection light, and determines whether interference light exists, based on the second incident light.

With this arrangement, the interference detection means has a second predetermined directivity different from the predetermined directivity of the light-receiving means, and scans the above-described scan to receive second incident light not including the pulsed reflection light. Therefore, when there is incident light that the interference detection means receives, it can be determined that the incident light is not reflection light but interference light.

In a preferred form of the invention, the distance measurement device further comprises data invalidation means which stores a direction of the second incident light as second incident light direction data calculates an incident direction of interference light based on the stored second incident light direction data, when the interference detection means determines that interference light exists, and makes invalid the distance data corresponding to the incident direction of interference light.

With this arrangement, the distance data corresponding to the incident direction of interference light is made invalid, so there is no possibility that the distance data corresponding to the incident direction of interference light is recognized as correct data by mistake.

In another preferred form of the invention, the distance measurement device further comprises distance data replacement means for replacing distance data made invalid when the interference detection means determines that interference light exits, with distance data in the incident direction of interference light at the time of a previous scan.

With this arrangement, the distance data replacement means replaces distance data made invalid when the interference detection means determines that interference light exits, with distance data in the incident direction of interference light at the time of a previous scan. Therefore, distance data with low reliability is excluded, and substitute distance data can be obtained.

In a further preferred form of the invention, the distance measurement device further comprises distance data interpolation means which calculates distance data of the incident direction of interference light based on distance data of a direction adjacent to the incident direction of interference light, when the interference detection means determines that interference light exits, and replaces the distance data made invalid with the calculated distance data.

With this arrangement, the distance data interpolation means calculates distance data of the incident direction of interference light based on distance data of a direction adjacent to the incident direction of interference light, when the interference detection means determines that interference light exits, and replaces the distance data made invalid with the calculated distance data. Therefore, distance data with low reliability is excluded, and substitute distance data can be obtained.

According to a further aspect of the invention, there is provided a distance measurement device comprising:

light-sending means for sending pulsed light toward an object of measurement where a distance thereto is measured, at the light-sending timing synchronized with a clock pulse;

light-receiving means for receiving incident light including pulsed reflection light reflected by the object;

distance measurement means for measuring the time from the sending of the pulsed light to the receiving of the incident light and calculating the distance to the object;

light-sending stop means for stopping the sending of the pulsed light at the next light-sending timing after the distance measurement by the distance measurement means;

interference detection means for determining whether interference light exists; and interference avoidance means for shifting the next light-sending timing and the light-sending timing thereafter, when the interference detection means determines that interference light exists.

When a plurality of same devices are used, there is a high possibility that interference light of the substantially same frequency is incident. Therefore, in the arrangement described above, the interference avoidance means shifts the next light-sending timing and the light-sending timing thereafter, when the interference detection means determines that interference light exists. As a result, a mistaken measurement of distance can be prevented.

In a preferred form of the invention, the interference avoidance means delays or quickens the light-sending timing for more than a distance measurement time equivalent to a distance measurable range.

With this arrangement, since in many cases interference light also has a periodicity, the interference avoidance means delays or quickens the light-sending timing for more than a distance measurement time equivalent to a distance measurable range, so that interference light is not incident during the distance measurement time. As a result, a mistaken measurement of distance can be prevented.

In another preferred form of the invention, the time that the interference avoidance means shifts the light-sending timing is an arbitrary value.

In a case where a plurality of same devices are used, interference light will again be incident when two opposite similar devices shift the light-sending timing at the same time by the same amount. Therefore, in the arrangement described above, the time that the interference avoidance means shifts the light-sending timing is an arbitrary value. As a result, the possibility that incident light is incident as interference light will become low.

In a further preferred form of the invention, the interference avoidance means shifts the light-sending timing immediately after the light-receiving timing at which the light-receiving means receives interference light.

In many cases, interference light also has a periodicity. Therefore, if the interference avoidance means shifts the light-sending timing immediately after the light-receiving timing at which the light-receiving means receives interference light, interference light will not be incident during the distance measurement time. As a result, a mistaken measurement of distance can be prevented.

In a further preferred form of the invention, the interference detection means detects the incident timing and period of interference light as well as determining whether interference light exists, and the interference avoidance means calculates, based on the incident timing and period of interference light, a chance that interference light overlaps pulsed light within a distance measurement time equivalent to a distance measurable range after the light-sending means sends pulsed light, and delays or quickens the light-sending timing so that interference light does not overlap pulsed light within the distance measurement time equivalent to a distance measurable range after the light-sending means sends pulsed light.

With this arrangement, the interference avoidance means calculates a chance that interference light overlaps pulsed light within a distance measurement time equivalent to a distance measurable range, and delays or quickens the light-sending timing so that interference light does not overlap pulsed light within the distance measurement time equivalent to a distance measurable range after the light-sending means sends pulsed light. As a result, interference light will not be incident during the distance measurement time.

According to a further aspect of the invention, there is provided a distance measurement device comprising:

light-sending means for sending pulsed light toward an object of measurement where a distance thereto is measured;

light-receiving means for receiving incident light including pulsed reflection light reflected by the object;

distance measurement means for measuring the time from the sending of the pulsed light to the receiving of the incident light and calculating the distance to the object;

interference detection means for detecting interference light sent by other light sources; and light-sending limit means for reducing or stopping an output of the pulsed light when the interference detection means detects the interference light.

When the interference detection means detects interference light sent by other light sources, there is a high possibility that the sending-light means sends pulsed light to other light source. Therefore, in the arrangement described above, the light-sending limit means reduces or stops an output of the pulsed light when the interference detection means detects the interference light. As a result, the amount of pulsed light that the driver of a vehicle provided with a similar device is subjected to can be reduced.

According to a further aspect of the invention, there is provided a distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by the object;

distance measurement means for measuring the time from the sending of the pulsed light to the receiving of the incident light and calculating the distance to the object;

interference detection means for detecting interference light sent by other light sources and an incident direction thereof; and light-sending limit means for reducing or stopping an output of the pulsed light when the scan light-sending means is directed toward the incident direction of the interference light as the interference detection means detects the interference light.

In this arrangement, the light-sending limit means reduces or stops an output of the pulsed light when the scan light-sending means is directed toward the incident direction of the interference light as the interference detection means detects the interference light. As a result, the amount of pulsed light that the driver of a vehicle provided with a similar device is subjected to can be reduced. Also, when the scan light-sending means is directed toward the direction other than the incident direction of interference light, a distance can be measured as usual by sending pulsed light. Therefore, a reduction in the distance measuring performance of the device can be minimized.

The above and other objects and advantages of the present invention will become apparent from the following detailed description of the preferred embodiments of the invention when the same is read in conjunction with the accompanying drawings.

DETAILED DESCRIPTION OF THE PREFERRED EMBODIMENTS

Embodiments of the present invention will hereinafter be described in detail with reference to the accompanying drawings.

First Embodiment

Figure 1:
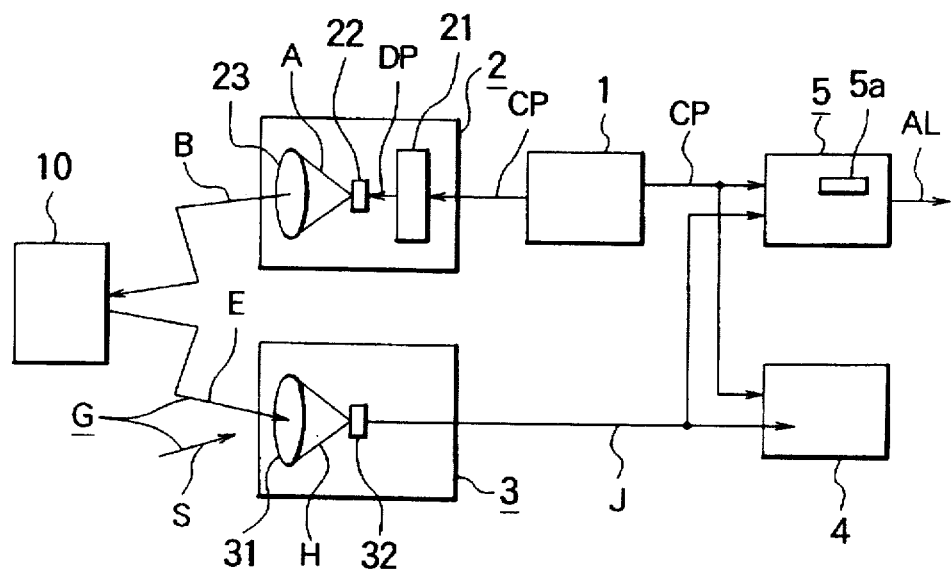
FIG. 1 is a block diagram showing a distance measurement device of a first embodiment of this invention.

FIG. 1 shows a distance measurement device constructed in accordance with a first embodiment of this invention. In the figure, reference numerals 1, 2, 3, 4 and 10 are the same as the above-described conventional device and therefore a description thereof is omitted by applying the same reference numerals. Interference detection means 5 has a display unit 5a, determines that interference light exists, when the level of a light reception signal J from light-receiving means 3 exceeds a predetermined value, and displays that effect on the display unit 5a and also generates interference detection signal AL.

In the distance measurement device thus constructed, light-sending means 2 sends a light beam B at the timings T1, T2, T3, . . . , and TN of a drive pulse DP synchronized with the clock pulse CP generated by clock pulse generation means 1, and the light beam is reflected by an object 10. The light-receiving means 3 receives incident light G including reflection light E reflected by the object 10 and converts it into a light reception signal J, which is input to distance measurement means 4 and interference detection means 5.

From the time difference between the timings T1, T2, T3, . . . , and TN of the drive pulse DP synchronized with the clock pulse CP input by clock pulse generation means 1 and the timings T1, T2, T3, . . . , and TN of the first light reception signal J output by the light-receiving means 3 after each light beam is sent, the distance measurement means 4 calculates and outputs distances D1, D2, D3, . . . , and DN based on Equation (1).

At the same time, the interference detection means 5 compares with a predetermined value $\alpha 0$ (see FIG. 2) the level L of the light reception signal J based on the incident light G that is first incident on the light-receiving means 3 after each light beam is sent. When the level L of the light reception signal J is $\alpha 0$ or more, the interference detection means 5 determines that interference light S exists in incident light G, and displays that effect on the display unit 5a and also generates interference detection signal AL.

That is, each time the distance measurement means 4 calculates a distance based on the light reception signal J first incident on the light-receiving means 3, the level L of the light reception signal J is compared with a predetermined value. And, when the level L of the light reception signal J is a predetermined value or more, that effect is displayed on the display unit 5a, so it can be understood that the distance calculated at that time is based on interference light.

Incidentally, if the light beam B sent by the light-sending means 2 is irradiated on object 10, reflection light E with an intensity corresponding to the reflectivity of the object 10 will be reflected. When the light-sending means 2 sends light beam B with a power W0 and a radiant solid angle $\Omega 0$, the illuminance Hr on the light-receiving means 3 by the reflection light E reflected by the object 10 having an area St at a point spaced by a distance R, a reflectivity K, and a radiant solid angle $\Omega t$ is given by the following laser equation $$Hr = P0 \times St \times K/R^4 \times \Omega 0 \times \Omega t \qquad \text{(Equation 2)}$$

The level L of the light reception signal J of the light-receiving means 3 is proportional to the illuminance Hr. Therefore, the level L of the light reception signal J by the reflection light E of the object 10 is inversely proportional to the distance $R^4$.

On the other hand, the illuminance Hd on the light-receiving means 3 on which interference light is directly incident from a similar distance measurement which is spaced by a distance R and sends pulsed light having the same power and radiant solid angle (P0, $\Omega 0$) as the device of the present invention is given by $$Hd = P0/R^2 \times \Omega 0 \qquad \text{(Equation 3)}$$

That is, since interference light (pulsed light from an opposite device) is directly incident, very strong light is incident on the light-receiving means 3, and accordingly, the level of the light reception signal J that is output by the light-receiving means 3 becomes high.

A ratio of light reception levels on light-receiving means 3 between interference light S and reflection light E is given by $$Hd/Hr = R^2 \times \Omega t / St \times K \qquad \text{(Equation 4)}$$

Assume now that the object 10 is a reflex reflector that is mounted on the rear reflecting mirror of a vehicle. If the radiant solid angle, reflection area, and reflectivity of the reflector are $\Omega t=10^{-3}$ (st), $St=2\times 10^{-3}$ (m$^2$) and $K=0.3$, the ratio of light reception levels on the light-receiving means 3 will be given by $$Hd/Hr = R^2 \times 1.67 \qquad \text{(Equation 5)}$$

According to this ratio, the level of the incident light S from another distance measurement device 50 m (R=50) ahead is 4000 times as much as that of the reflection light E from the reflex reflector.

Therefore, when in this kind of distance measurement device an object of measurement 10 is assumed to be the above-described reflex reflector of a vehicle, a value which is, for example, 10 times as much as the reflection light S from the reflex reflector is set as a reference value α0 for determining whether interference light exists. In this embodiment, the level of interference light S is very high like 4000 times, so the interference light S and the normal reflection light E from the object 10 can be distinguished with reliability.

Thus, interference light S is far stronger than reflection light E. Therefore, even if reference value α0 for determining interference light S were set to a value sufficiently greater than the maximum level that light-receiving means 3 receives (in this embodiment, 10 times), it could reliably be determined whether interference light exists.

Second Embodiment

In the first embodiment, it has been described that the interference detection means 5a compares the level L of the light reception signal J output by the light-receiving means 3 with a predetermined value α0 to detect interference light. However, in the second embodiment, according to the distance data D calculated by distance measurement means 4, a determination level αv for the level L of the light reception signal of light-receiving means 3 is set to a greater value for a short distance and a smaller value for a long distance so that the incidence of interference light S can be detected more reliably.

As described above, the reflection light E from object 10 is scattered, the illuminance Hr of the reflection light E on light-receiving means 3 is reduced in inverse proportion to distance $R^4$, as shown in Equation 2, and the reflection light E becomes weaker if the object 10 is far away, so the level L of the light reception signal J output by the light-receiving means 3 becomes smaller. On the other hand, the illuminance Hd of interference light S that is incident from other distance measurement devices directly on the light-receiving means 3, is attenuated in inverse proportion to distance $R^2$, as shown in Equation 3.

Figure 2:
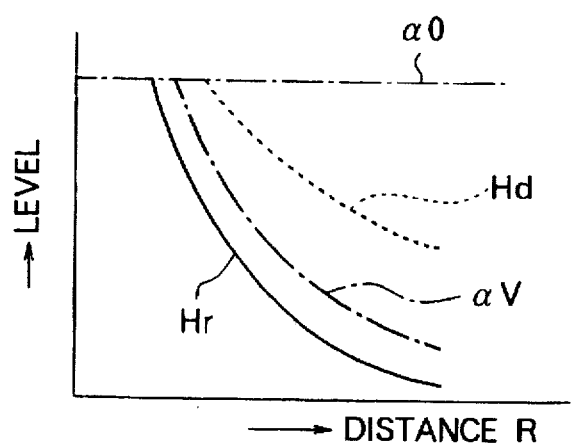
FIG. 2 is a diagram showing the determination level in a second embodiment of this invention.

Therefore, the determination level αv, as shown in FIG. 2, is set to a value which is greater than the level Hr of reflection light E, smaller than the level Hd of interference light S, and reduced in inverse proportion to distance $R^2$. With this, there can be detected interference light S which is stronger than the reflection light E from the object 10 and is incident from other distance detection means directly on the light-receiving means 3, and other interference light which is weaker than this interference light S and greater than αv. As a result, interference light can be detected more reliably.

Third Embodiment

Also, interference detection means 5 stores the levels L1, L2, L3, . . . , and LN of the light reception signals of light-receiving means 3 and the distance data D1, D2, D3, . . . , and DN output by distance measurement means 4, over a plurality of times, i.e., at the timings T1, T2, T3, . . . , and TN of a drive pulse DP. And, for the respective values, the interference detection means 5 calculates from the stored values a statistical fluctuation value such as a standard deviation or sum of absolute values of differences between continuous data. And, when a fluctuation in the distance data D1 to DN is greater than a predetermined value and a fluctuation in the levels L1 to LN of the light reception signals is smaller than a predetermined value, it can also be determined that interference light exists.

Generally speaking, when a distance measurement device continuously detects the same object 10, the fluctuation in the distance data D1 to DN is small and the intensity GK of incident light G is substantially constant, so the fluctuation in the levels L1 to LN of the light reception signals is small. When, on the other hand, the distance measurement device detects a plurality of objects in various positions, the fluctuation in the distance data D1 to DN becomes greater and also the fluctuation in the levels L1 to LN of the light reception signals becomes greater.

However, since pulsed light which is generated by an opposite distance measurement device and becomes interference light S is not emitted in synchronization with light-sending means 2, the timing at which distance measurement means 4 measures and the timing at which interference pulsed light S is incident on light-receiving means 3 are not synchronized.

Therefore, the distances D1 to DN calculated by the distance measurement means 4 are not constant and become random values, so the fluctuation becomes very greater.

Conversely, since the position of a source of interference light is not greatly changed within a plurality of distance measurement times, the levels L1 to LN of the light reception signals of light-receiving means 3 become substantially constant and the fluctuation is small. Interference detection means 5 calculates a fluctuation σD in distance data D1 to DN and a fluctuation σL in light reception signal levels L1 to LN and, when the distance fluctuation σD is great and the level fluctuation σL is small, determines that interference light S has been incident. Therefore, whether interference light S exists in incident light S can be determined with reliability.

Figure 3:
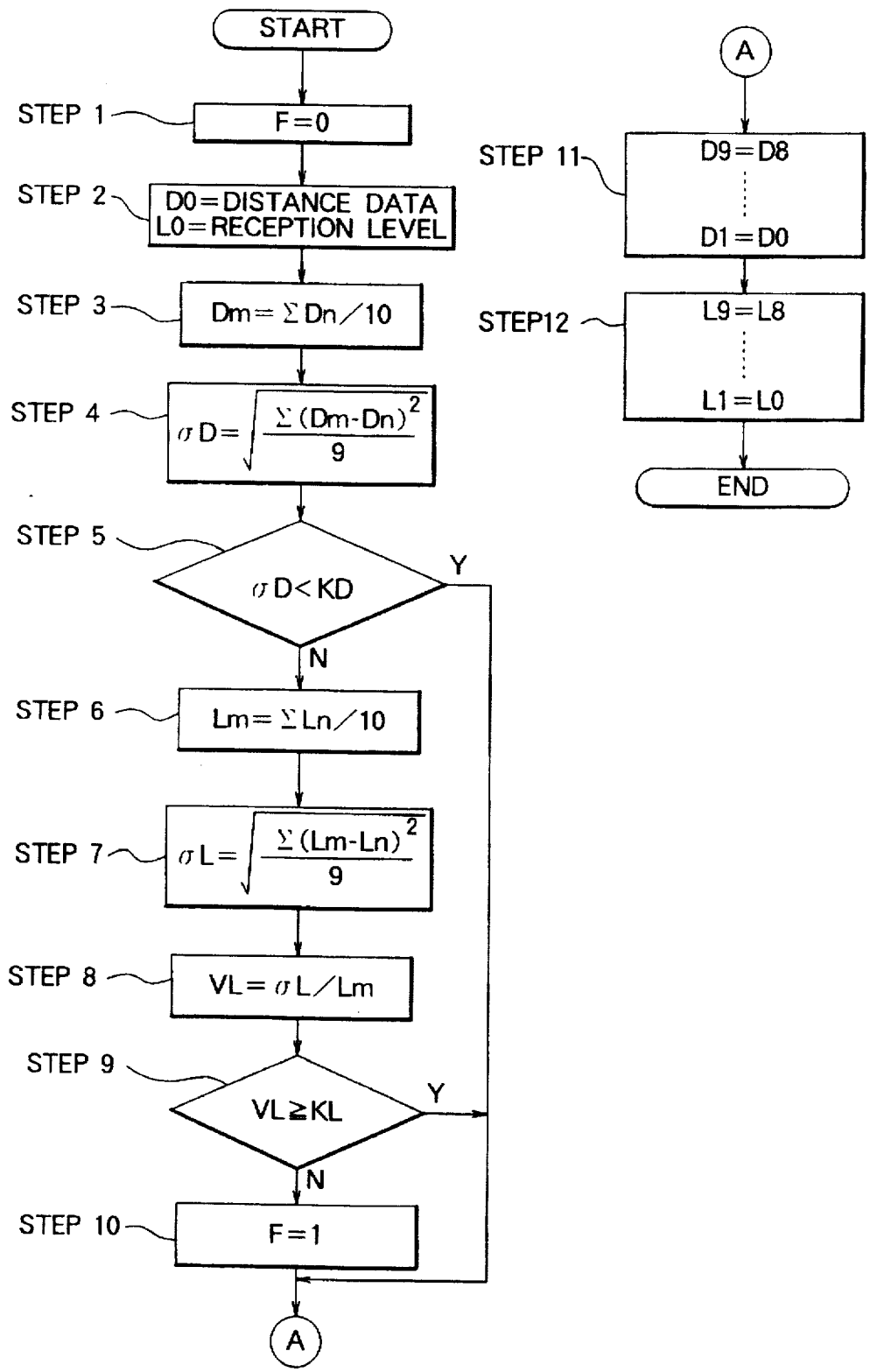
FIG. 3 is a flowchart showing the operation of a third embodiment of this invention.

The above-described operation of the interference detection means 5 will be described further in detail with reference to a flowchart of FIG. 3. Nine distance data D1 to D9 were measured with a resolving power of 0.1 m and the light reception signal levels L1 to L9 were normalized with a maximum value of 1.

The following process operation is performed once for a single measurement, and the results of measurement for the past nine measurements have been stored in distance data storage registers RD1 to RD9 and signal level storage registers RL1 to RL9, respectively.

First, in step 1 an interference detection flag F for storing a detection result of the incidence of incident light S is cleared (F=1). In step 2, distance data D0 measured this time is stored in the register RD0, and a light reception signal level L0 is stored in the register RL0.

In step 3, an average value Dm of ten consecutive distance data including a current measurement result and the past nine data is obtained. In step 4, a standard deviation σD is obtained by an equation, $\{\Sigma(Dm-Dn)^2/9\}^{1/2}$ where Dm represents the average value of distance data D0 to D9 obtained in step 3 and Dn represents the measured value of each data.

Next, in step 5 the standard deviation σD of distance data is compared with a predetermined value KD which is, for example, a value (1 m) ten times greater than a resolving power 0.1 m of distance measurement. If σD is less than KD, a fluctuation in distance data D0 to D9 will be small-and stable, and since this is not the incident of interference light S, step 5 will advance to step 11.

If, on the other hand, σD is greater than KD, distance data will have a fluctuation and step 5 will advance to step 6. In step 6, an average value Lm of light reception signal levels L0 to L9 is obtained.

In step 7, a standard deviation σL of light reception signal levels L0 to L9 is obtained in the same way as step 4. Further, in step 8 the degree of fluctuation, VL, of the light reception signal levels L is obtained by dividing the standard deviation σL of the light reception signal levels by the average value Lm of the light reception signal levels.

When in step 9 the degree of fluctuation VL of the light reception signal levels is greater than or equal to a predetermined value KL (for example, 0.01), the light reception signal level L has a fluctuation and is not constant. Since this is not the incidence of interference light S, step 9 advances to step 11.

On the other hand, when in step 9, VL is less than KL (0.01), there is no fluctuation in the light reception signal levels L1 to L9 and step 9 advances to step 10. In step 10, the incidence of interference light S is assumed to exist and the interference detection flag F is set to a 1, because it has been determined in step 5 that distance data D0 to D9 has a fluctuation and it has been determined in step 8 that light reception signal levels L0 to L9 have no fluctuation.

In step 11, current distance data and the stored contents of registers RD0 to RD8 in which the past eight distance data D0 to D8 have been stored are transferred to registers RD1 to RD9, respectively. That is, stored data are transferred so that the content of the register RD8 is transferred to the register RD9 and then the content of the register RD7 is transferred to the register RD8. In step 12, the contents of registers RL0 to RL8 in which the data L0 to L8 of the light reception signal levels have been stored are likewise transferred to registers RL1 to RL9, respectively, and prepared for the interference detection process in the next distance measurement.

With the above-described operation, the interference detection flag F is set to a 1 when there is a fluctuation in distance data D0 to D9 and there is no fluctuation in light reception signal levels L1 to L9. Therefore, when distance data is used, whether interference light exists can be detected by monitoring this interference detection flag F. Also, depending on the state of this interference detection flag F, that effect can be displayed on the display unit 5a and also the interference detection signal AL can be generated.

Fourth Embodiment

Further, the generation timing, tdp, of the drive pulse DP of light-sending means 2 synchronized with the clock pulse CP from clock pulse generation means 1, and a light reception signal J from light-receiving means 3 are input to interference detection means 5. On the other hand, a gate time signal Gs having a time width Tf more than a distance measurement interval Tφ equivalent to the distance measurable range Dmax of distance measurement means 4 is generated from the clock pulse CP with a one-shot timer (not shown). And, the interference detection means 5 can also determine the incidence of interference light S by detecting the light reception signal J caused by the incident light G of light-receiving means 3 for a time after the sending time, t=tdp+Tf, of the gate time signal Gs.

As described above, since the reflection light E from the object 10 which is incident on the light-receiving means 3 is attenuated in inverse proportion to distance $R^4$, the reflection light E reflected from a position at which the distance measurement means 4 cannot measure is very weak light that cannot be detected practically. Therefore, incident light G which is incident after the above-described gate time signal G is sent and which is converted into a significant light reception signal J, can be determined to be interference light S.

Fifth Embodiment

Unlike that the above-described fourth embodiment generates the gate time signal Gs from the clock pulse CP, the time data Td from the sending of a light beam B to the receiving of an incident light G is input from distance measurement means 4 to interference detection means 5. And, the incidence of interference light S may be detected by whether that time data Td exceeds a predetermined value Tcon more than the distance measurement period Tφ equivalent to the distance measurable range Dmax of distance measurement means 4.

That is, when the time data Td exceeds Tcon, it can be determined that interference light S exists in incident light corresponding to that time data.

Thus, whether interference exists can directly be detected from the distance data of the distance measurement means 4. Therefore, the above-described one-shot timer for generating a gate time signal Gs becomes unnecessary and the device can be made structurally simpler.

Sixth Embodiment

In this embodiment, the distance data Dd calculated based on the time Td measured by the above-described distance measurement means 4 is used. Even if it is determined that incident light G where distance data Dd is more than a predetermined value is incident light S, the exactly same result will be obtained.

Since the interference light in the above-described fifth and sixth embodiments is incident after the distance measurement time Tφ corresponding to the distance measurable range Dmax, it does not give an error to the distance measurement. However, there is the possibility that in the measurement thereafter, interference light is incident within the distance measurement time Tφ and causes an error in the distance measurement.

Seventh Embodiment

Also, instead of determining by whether the time data Td obtained in the fifth embodiment exceeds a predetermined value Tcon (≧Tφ), interference detection means 5 calculates a period Ti from the period of the clock pulse CP, i.e., the occurrence period Tc of the pulsed light A, and from the time data which, among the time data TN measured by distance measurement means 4, exceeds a predetermined value Tcon, and can determine that interference light S exists in incident light, when the incident light has a periodicity.

The periodicity and components of this incident period Ti of interference light S can easily be detected, for example, by adding the pulsed light generation period Tc of light-sending means 2 to the time data Tn measured by distance measurement means 4 and then transforming (high-speed Fourier transform) the added value as data.

If, as a result of the confirmation of periodicity, the period Ti of interference pulsed light S is substantially the same as the occurrence period Tc of light beam B, it will be specified that a source of interference light is the same kind of device. When interference light is different in period but has a periodicity, it can be determined that the interference light is interference light generated by another kind of distance measurement device.

Eighth Embodiment

Figure 4:
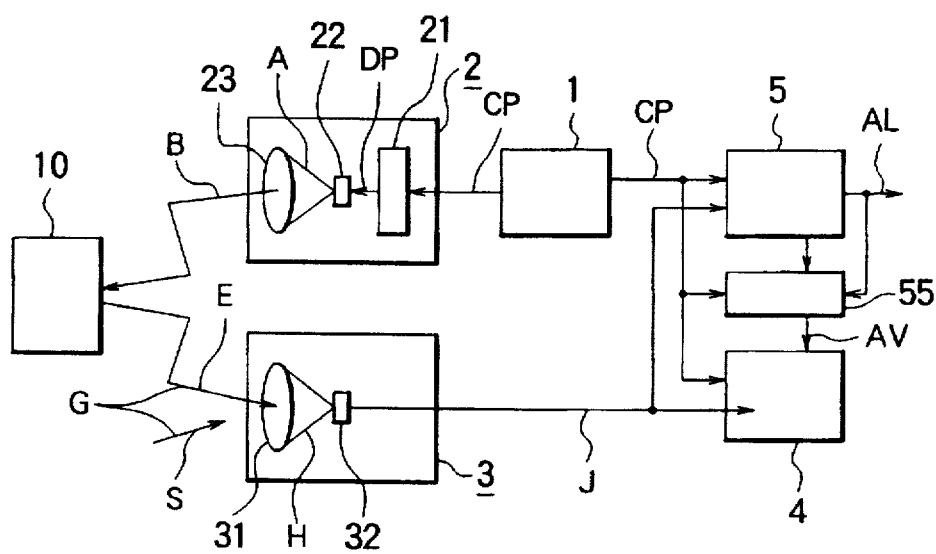
FIG. 4 is a block diagram showing a distance measurement device of an eighth embodiment of this invention.
Figure 5:
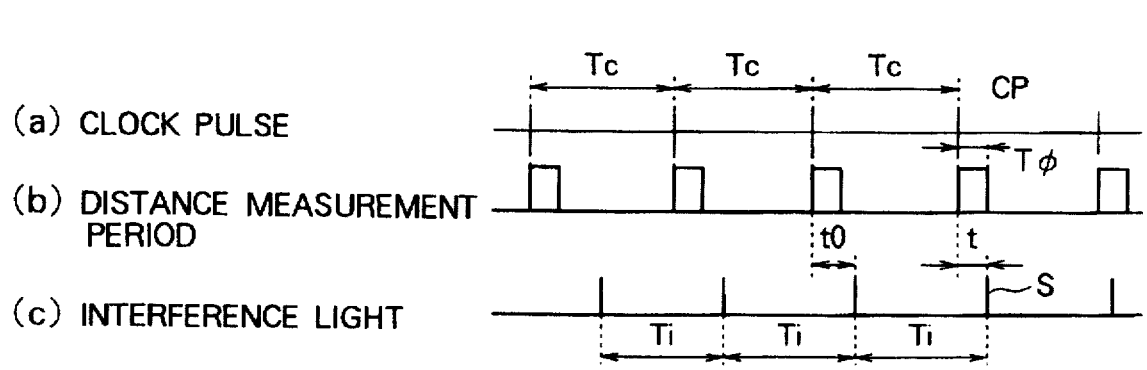
FIG. 5 is a diagram used to explain the operation of the distance measurement device of the eighth embodiment of this invention.

FIG. 4 is a block diagram showing a distance measurement device constructed in accordance with an eighth embodiment of this invention, and FIG. 5 is a diagram used to explain the operation of the distance measurement device of the eighth embodiment. FIG. 5(a) shows the timing of a clock pulse CP, FIG. 5(b) shows the output B of pulsed light sent by light-sending means 2, and FIG. 5(c) shows a light reception signal caused by reflection light E from an object 10. In FIG. 4 there is shown data invalidation means 55. As shown in FIG. 5, the incidence timing t (FIG. 5(c)) of interference light S at the time of a current distance measurement is calculated from a clock pulse period Tc (FIG. 5(a)) and the previous incidence timing t0 (FIG. 5(b)) of interference light, and from the incidence period Ti (FIG. 5(c)) of interference light S obtained by the above-described interference detection means 5.

And, when it is estimated that interference light is incident between the occurrence of the clock pulse CP and the distance measurement period Tφ equivalent to the distance measurable range Dmax of distance measurement means 4, it is determined that there is a high possibility that current distance data measured by the distance measurement means 4 includes an error caused by interference light S, and data invalidation signal AV is sent to the distance measurement means 4 to make the current distance data invalid. Also, that effect is displayed on a display unit 5a.

The incidence timing t of interference light S at the current distance measurement after generation of a clock pulse can be calculated, for example, by subtracting the clock pulse period Tc from the sum of the previous incidence timing t0 of interference light and the incidence period Ti of interference light S (t=t0+Ti−Tc). Thus, the reliability of a system using the distance measurement device of this invention can be made very high by making invalid distance data having a high possibility of interference light.

Ninth Embodiment

While in each embodiment described above it has been described and illustrated that distance measurement means 4 calculates a distance based on a light reception signal J that is generated by the first incident light-after pulsed light beam B is sent, the distance may be calculated by the following method.

When incident light is incident several times between the time that a light beam B is sent and the time that the next light beam B is sent, a plurality of distance data are calculated based on the light reception signal J that is based on each incidence light. At the same time, whether the intensity of each light reception signal J is more than a predetermined value is determined by the same method as that described in the first and second embodiment. And, when the intensity of the signal J is more than a predetermined value, it is determined that the signal J is based on interference light S, and distance data based on this signal J is made invalid. Also, distance data outside a predetermined range, such as distance data exceeding a distance measurable range Dmax, is determined to be based on interference light and is excluded. In this way, if one distance data remains, this distance data can be considered as correct distance data.

Tenth Embodiment

Figure 6:
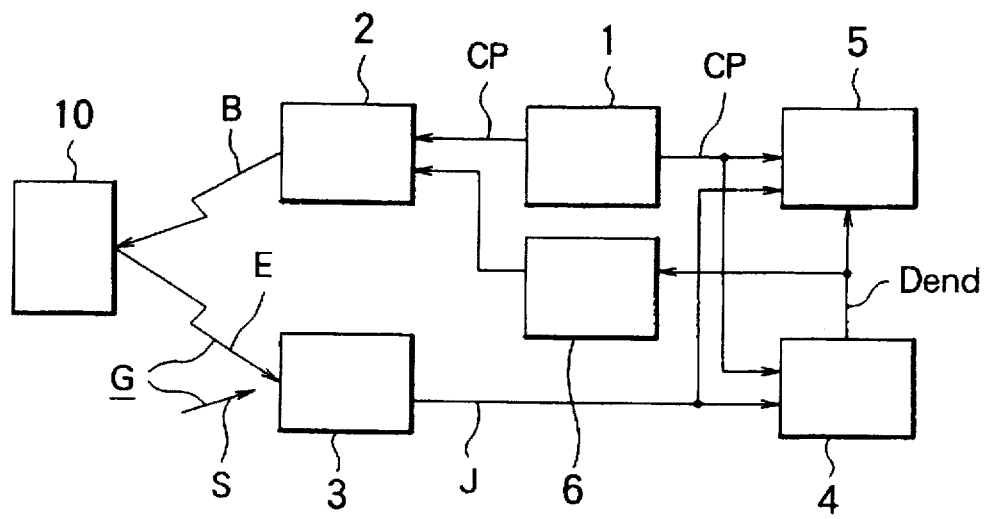
FIG. 6 is a block diagram showing a distance measurement device of a tenth embodiment of this invention.

FIG. 6 illustrates a distance measurement device constructed in accordance with a tenth embodiment of this invention. In this embodiment, light-sending stop means 6 is added to the device of FIG. 1. The light-sending stop means 6 receives a distance detection end signal Dend from distance measurement means 4 and stops the generation of pulsed light A synchronized with the next clock pulse timing CP. That is, the light emitting of a laser diode 22 of light-sending means 2 is stopped.

Of course, instead of stopping the generation of pulsed light A of light-sending means 2, the sending of a light beam B may be stopped by stopping the light beam B.

The light reception signal J of light-receiving means 3 during the time the light-sending means 2 stops generating pulsed light A is input to interference detection means 5. Based on the level L of the input signal, the interference detection means 5 can determine whether interference light S exists in incident light G.

That is, when the light-sending means 2 does not generate the pulsed light A, there is no reflection light from an object 10 and therefore the light-receiving means 3 does not output the light reception signal J. However, when interference light S exists in the light G incident on the light-receiving means 3, the light-receiving means 3 outputs the light reception signal J independently of the generation of pulsed light A by the light-sending means 2.

Therefore, if the interference detection means 5 detects the light reception signal J of the light-receiving means 3 during the time the light-sending means 2 stops generating pulsed light A, the existence of interference light S can be detected. Particularly, since a similar distance measurement device becomes a source of interference light, there is no great difference between the light-sending periods of pulsed light, and the reliability of distance data measured immediately before the light-sending means 2 stops the generation of pulsed light A is extremely low. As a result, it may be determined that the above-described distance data is mistaken distance data caused by interference light.

Eleventh Embodiment

In interference detection means 5, the level L1 of the light reception signal J of light-receiving means 3 at the time of distance measurement is stored, and the level L0 of the light reception signal of the light-receiving means 3 during the next stop of generation of pulsed light A is compared with the level L1 of the light reception signal at the time of the previous distance measurement. And, when a difference (L0−L1) between the light reception signal levels is small, it can be determined that interference light S exists in incident light.

The location of a source of interference light S does not so much change within a single distance measurement time interval Tc, for example, 100 µs. For example, when a vehicle with the device of this invention travels at a speed of 100 km/hr and the speed of the preceding vehicle is 70 km/hr (relative speed of 30 km/hr), a change in the relative distance between the two vehicles is :about 0.83 m for 100 µs. Therefore, the level L of the light reception signal at the light-receiving means 3 will become substantially constant. If the levels L1 and L0 of the light reception signals of the light-receiving means 3 at the time of the distance measurement and at the time of the stop of pulsed light generation are substantially equal or if a difference therebetween is small, it may be determined that the two levels are based on a source of interference light.

Twelfth Embodiment

Also, in interference detection means 5, if the time width of a distance measurement time $T\phi$ equivalent to the distance measurable range Dmax of distance measurement means 4 from the generation of a clock pulse which becomes the generation timing of pulsed light A is assumed to be, for example, Dmax=150 m, a gate time signal Gs equivalent to a time width of $T\phi=1$ µs is generated, for example, by a one-shot timer. And, when light-receiving means 3 outputs a light reception signal J after distance measurement means 4 detects a distance and between the clock pulse timing at which light-sending stop means 6 stops the sending of pulsed light of light-sending means 2 and the time that the gate time signal Gs is generated, it can be estimated that interference light is incident during the distance measurement time of the distance measurement means 4 and it can also be estimated that there is a high possibility that the previous distance data is calculated based on the interference light.

Thus, the interference light incident during the distance measurement time $T\phi$ is harmful because a mistaken distance is calculated by the distance measurement means 4. However, even if interference light were incident after the distance measurement time $T\phi$, there would be no influence of the interference light because a distance calculation is not made until the next light-sending time if reflection light E has been incident before the interference light is incident and a distance calculation has been made.

Also, when the light reception signal J is output after the gate time signal Gs is sent, i.e., after the distance measurement time $T\phi$, it may be made invalid by providing data invalidation means, because a light reception signal such as this exceeds the distance measurement time $T\phi$. Therefore, even if interference light S existed, mistakenly calculated distance data could be excluded.

Thirteenth Embodiment

Further, interference detection means 5 can prevent a mistaken measurement caused by the incidence of interference light, by the value of distance data that is output by distance measurement means 4 after the distance measurement means 4 detects a distance and light-sending stop means 6 stops the sending operation of light-sending means 2 from generating pulsed light A.

That is, if distance data within a distance measurable range is output by the distance measurement means 4 even after the generation of pulsed light A is stopped, a distance will be calculated based on a light reception signal J that is based on interference light G received during the distance measurement time $T\phi$ until the above-described gate time signal Gs is sent. Therefore, it can be estimated that there is a high possibility that interference light has been incident during the distance measurement time $T\phi$ of the distance measurement means 4 and the previous distance data is calculated on the interference light.

Also, when a distance measured exceeds the distance measurement range, the distance could be invalidated as an abnormal value by invalidation means even if interference light existed.

Thus, the interference light incident during the distance measurement time $T\phi$ is harmful because a mistaken distance is calculated by the distance measurement means 4. However, even if interference light were incident after the distance measurement time $T\phi$, there would be no influence of the interference light because a distance calculation is not made until the next light-sending time if reflection light E has been incident before the interference light is incident and a distance calculation has been made.

Also, in this case, whether interference light exists during the distance measurement time can be detected from the distance data of the distance measurement means 4. Therefore, a one-shot timer for generating a gate time signal Gs such as the above-described twelfth embodiment becomes unnecessary and the device can be made structurally simpler.

Fourteenth Embodiment

Also, light-sending stop means 6 stops sending light between the next light-sending timing after distance measurement and a plurality of light-sending timings, detects the periodicity or intensity change of incident light that is incident during this stop, and can determine that interference exists, when the periodicity exists or the intensity does not change.

For example, in a case where a plurality of similar distance measurement devices are used and pulsed light where the period of generation is substantially equal is generated from various places, the distance measurement devices interfere each other and a possibility of a mistaken measurement becomes high. In such case, interference light caused by a device generating pulsed light having a similar period can be detected. And, distance data based on the interference light can be invalidated as mistaken distance data.

Fifteenth Embodiment

Figure 7:
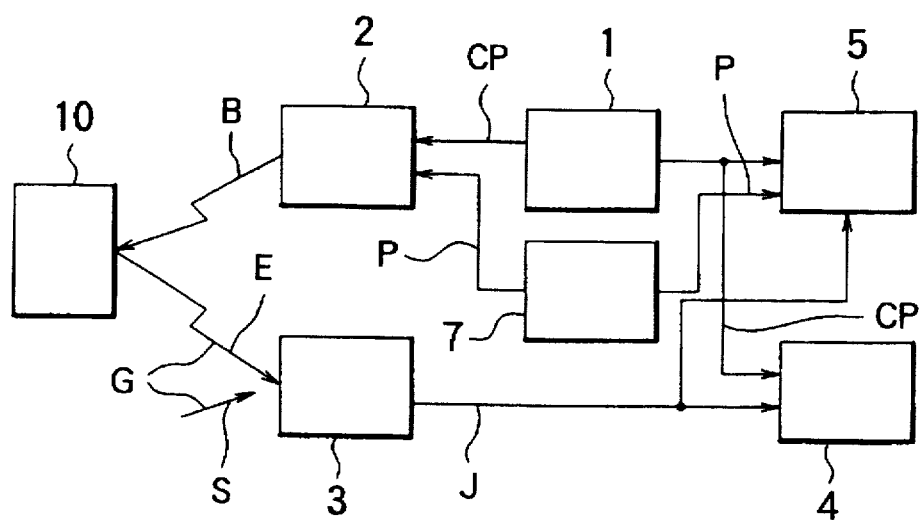
FIG. 7 is a block diagram showing a distance measurement device of a fifteenth embodiment of this invention.
Figure 8:
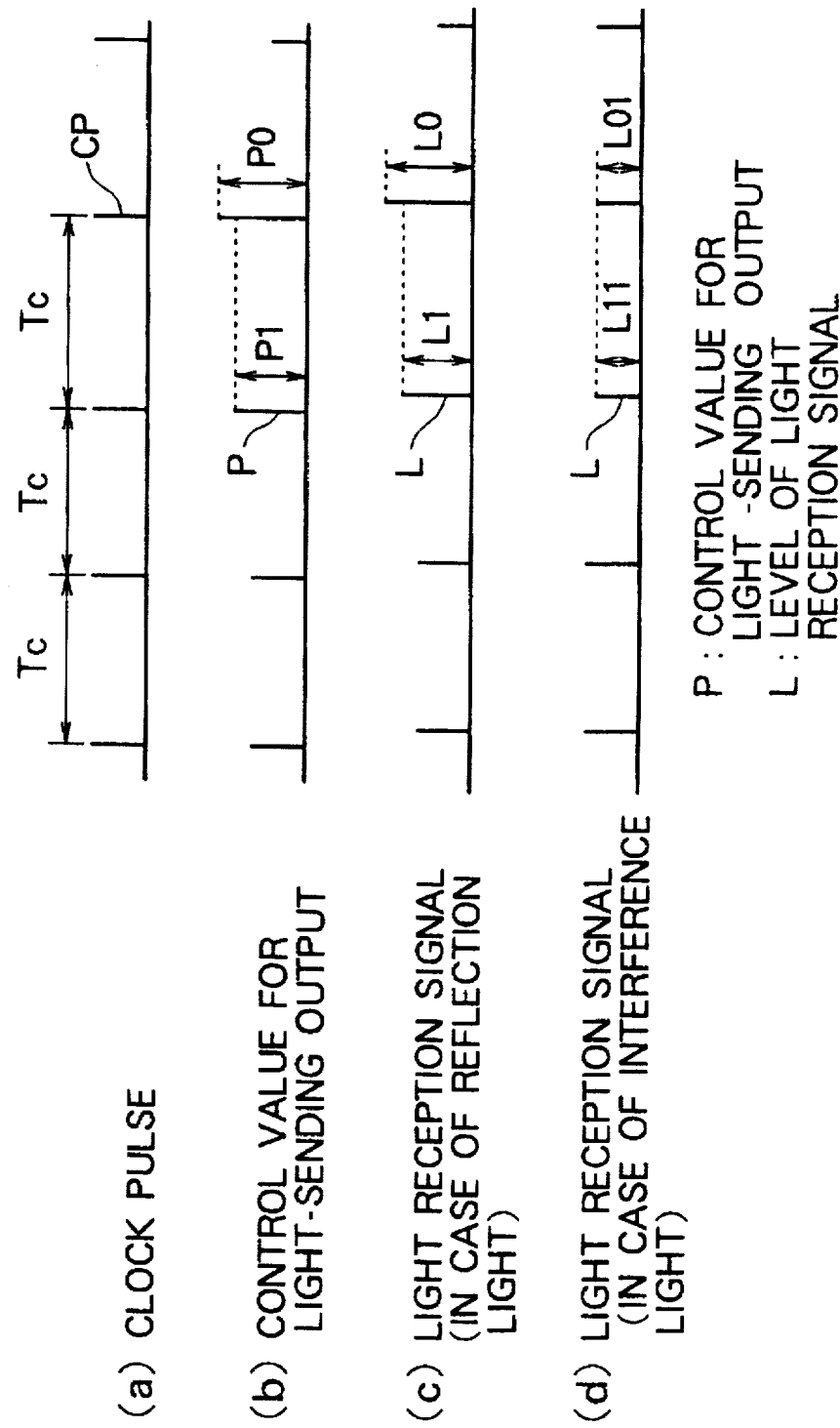
FIG. 8 is a diagram used to explain the operation of the distance measurement device of the fifteenth embodiment of this invention.
Figure 9:
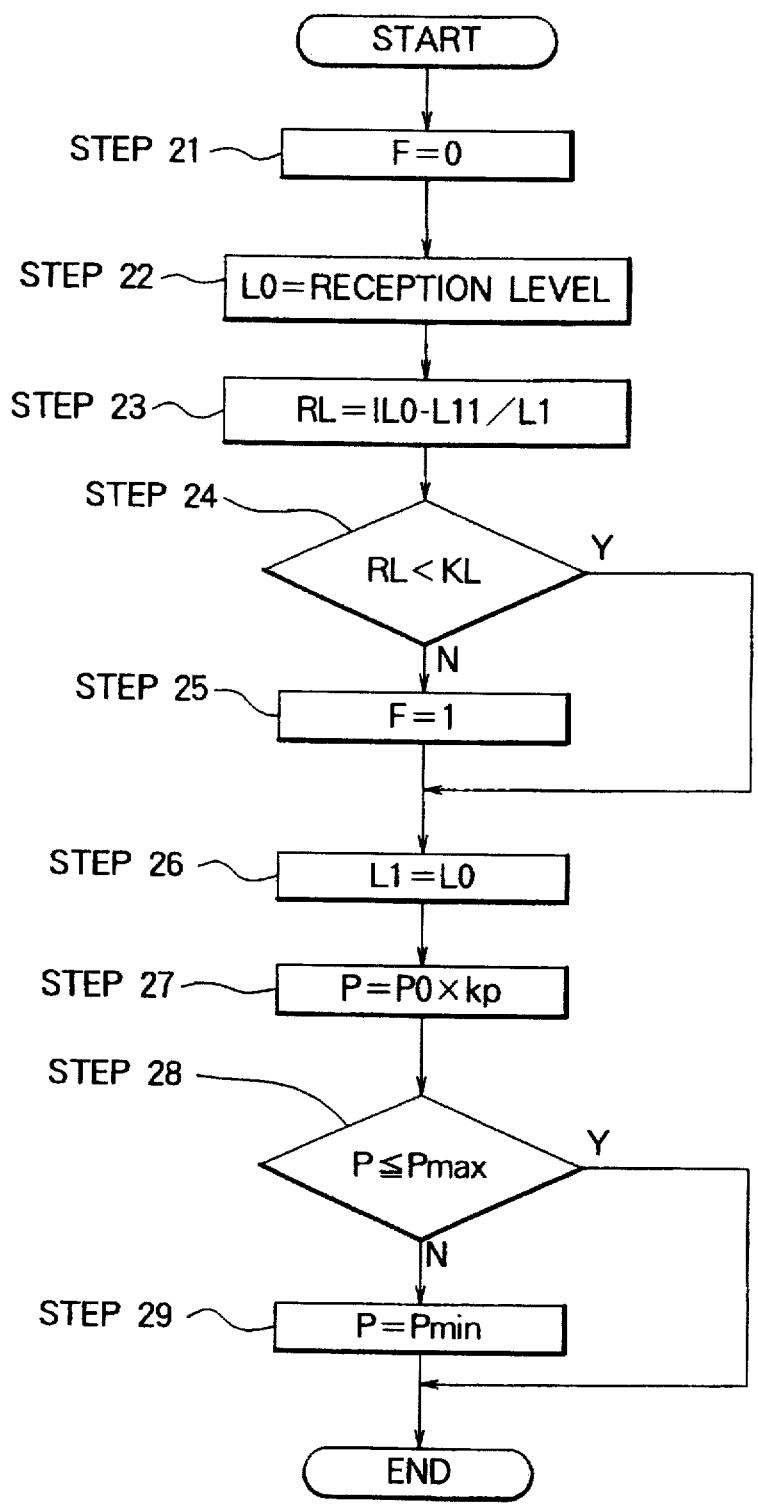
FIG. 9 is a flowchart showing the operation of the fifteenth embodiment of this invention.

FIGS. 7, 8, and 9 illustrate a distance measurement device constructed in accordance with a fifteenth embodiment of this invention. FIG. 7 is a block diagram showing the structure of the device, FIG. 8 is a diagram used to explain the operation of the device, and FIG. 9 is a flowchart showing the operation of the device. FIG. 8(a) shows the timing of a clock pulse CP, FIG. 8(b) shows the output control value P of the light-sending output W of light-sending means 2, FIG. 8(c) shows a light reception signal L based on the reflection light E from an object 10, and FIG. 8(d) shows a light reception signal as incident light G is interference light S.

In FIG. 7, light-sending output control means 7 increases and decreases the output of pulsed light A that is generated by light-sending means 2. When detecting a distance, interference detection means 5 stores the light-sending output W of the light-sending means 2 or the output control value P of the light-sending output control means 7, and also stores the level L of a light reception signal J that is output by light-receiving means 3. The interference detection means 5 determines whether interference light S exists, by whether the level L of the light reception signal J changes according to the increase and decrease in the light-sending output w at the time of measurement.

The intensity of the reflection light E from the object 10 is proportional to the intensity of a light beam B sent by the light-sending means 2, that is, the light-sending output W. Therefore, the level L of the light reception signal J is proportional to the intensity of the light beam B.

Note that the output control value P of the light-sending output control means 7 is used instead of the light-sending output W.

Then, the output control value P1 of the light-sending output control means 7 at the time of a previous measurement and the level L of the light reception signal J at that time are stored, and for example, at the time of a current measurement the output control value is increased from P1 to P0, as shown in FIG. 8(b). And, the rate of change in the level of the light reception signal J is obtained from the absolute value (|L0–L1|) of a difference between the level L0 of the current light reception signal J and the level L1 of the previous light reception signal J (FIG. 8(c)) by the following equation $$RL=(|L0-L1|)/L1$$

And, whether that value exceeds a predetermined value is determined.

When the light reception signal J is based on interference light S, a change is very small as shown in L11 and L10 of FIG. 8(d). Therefore, when the change rate is less than a predetermined value, it is determined that the light reception signal J output by the light-receiving means 3 is not based on the reflection light E from the object 10, so it can be determined that the light reception signal J is based on interference light S. In this way, in this embodiment, whether interference light S exists is detected.

Further, the operation Of the fifteenth embodiment will be described in detail with respect to the flowchart of FIG. 9.

The following process operation is performed once for a single measurement, and the control value P1 of the light-sending output proportional to the light-sending output W1 at the time of a previous measurement has been stored in a register RP1, and the level L1 of the light reception signal has been stored in a register RL1.

In step 21, an interference detection flag F for storing a result of the incidence of incident light S is cleared (F=0). In step 22, the level L0 of a current light reception signal is stored in a register RL0. In step 23, the change rate of the current signal level L0 to the previous signal level L1 is obtained by dividing the absolute value of the difference between the level L0 of the current light reception signal J and the level L1 of the previous light reception signal J by the previous signal level L1. That is, the change rate is obtained by the following equation $$RL=(|L0-L1|)/L1$$

In step 24, the change rate RL of the level L of the light reception signal J is compared with a predetermined Value KL sufficiently smaller than the rate of increase, Kp (=P0/P1−1), of the control value P of the light-sending output. When is greater than KL, the level L of the light reception signal changes and it is determined that the light reception signal is not based on interference light S. Step 24 then advances to step 26. Note that KL is set to 0.05 which is ¼ the rate of increase (Kp=0.2 (20%)).

When, on the other hand, RL is less than EL, the level L of the light reception signal does not change, the light reception signal is based on interference light, and step 24 advances to step 25. In step 25, since it was determined that the level L of the light reception signal does not change although the control value P of the light-sending output was changed, the incidence of interference light S is determined and the above-described interference detection flag F is set to a 1.

In step 26, data in the register RL0 where the level L0 of the current light reception signal has been stored is transferred to the register RL1.

Next, in step 27 the next control value P of the light-sending output is calculated by multiplying the current control value P0 by a predetermined increase coefficient Kp, for example, a value of 1.2 if the output is increased by 20%).

In step 28, it is determined if the control value P of the light-sending output calculated in step 27 does not exceed the maximum output Pmax of the device. When the control value P does not exceed Pmax, the operation is ended. When the control value P exceeds Pmax, step 28 advances to step 29. In step 29 the control value P is set to a control minimum value Pmin, and the operation is ended.

In the above-described operation, when the level L of the light reception signal does not change although the control value P of the light-sending output was changed, the incidence of interference light S is determined and the above-described interference detection flag F is set to a 1. Therefore, when the distance data is used, the existence of interference light can be detected by monitoring this interference detection flag F.

The above-described interference detection means 5 calculates, from the previous and current control values P1 and P0 of the light-sending output, an increase rate RP thereof, and likewise calculates, from the previous and current levels L1 and L0 of the light reception signal, an increase rate RL thereof. And, when the difference between the increase rate RP of the control value of the light-sending output and the increase rate RL of the level of the light reception signal is less than a predetermined value, it can determined that the light reception signal J output by light-receiving means 3 is based on the reflection light E from object 10. This is because, when interference light S does not exist in incident light G and only reflection light E is incident, the control value P of the light-sending output is substantially proportional to the level L of the light reception signal.

When it is detected, in this way, that there is no incidence of interference light, there is no interference light during measurement, and distance data is obtained correctly. The distance data output by the distance measurement means 4 can be considered as data having high reliability.

While in the above embodiment the control value P of the light-sending output has been increased to detect whether interference light exists, the existence of interference light can be detected even if the control value P is decreased or changed in both increasing and decreasing directions.

Also, it is a matter of course that the light-sending output W may be used instead of the control value P of the light-sending output.

Sixteenth Embodiment

Figure 10:
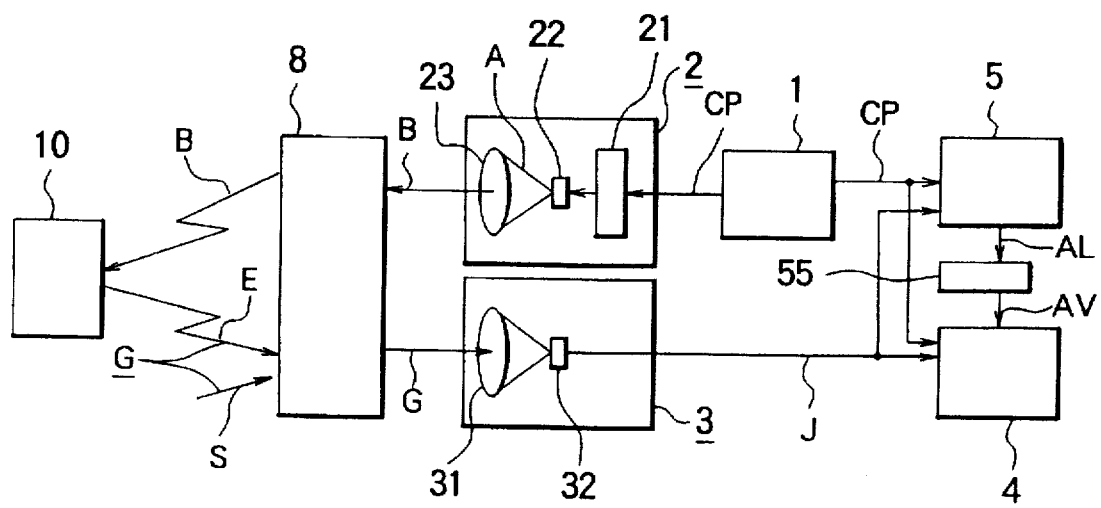
FIG. 10 is a block diagram showing a distance measurement device of a sixteenth embodiment of this invention.
Figure 11:
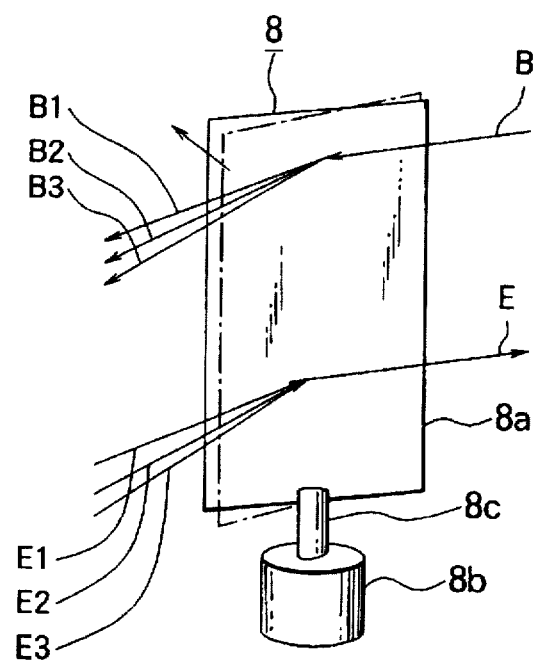
FIG. 11 is a perspective view showing the scan means of the distance device of the sixteenth embodiment of this invention.

FIG. 10 illustrates a distance measurement device constructed in accordance with a sixteenth embodiment of this invention, and FIG. 11 is a perspective view showing the scan means of the distance device of the sixteenth embodiment. In these figures, reference numerals 1 to 5 and 10 are the same as the embodiment shown in FIG. 1. In FIGS. 10 and 11, scan means 8 scans the traveling direction of a light beam B generated by light-sending means 2 and the light receiving direction of light-receiving means 3 in the horizontal direction at the same time.

The scan means 8 includes a sheet-shaped reflecting mirror 8a fixedly supported by the rotational shaft 8c of a motor 8b, and the reflecting mirror 8a is rotated over a range of predetermined angle in clockwise and counterclockwise directions by the motor 8b (FIG. 11). This scan means 8 is arranged ahead of the light-sending lens 23 of the light-sending means 2 and the light-receiving lens 31 of the light-receiving means 3.

It is noted that the scan means 8 and the light-sending means 2 constitute scan light-sending means of this invention.

And, the reflecting mirror 8a is rotated so that the light sending direction of the light beam B is changed as shown by B1 to B3 of FIG. 11 and the light receiving direction (incident direction of reflection light E) of the light-receiving means 3 is changed as shown by E1 to E3 of FIG. 11. These directions are changed at the same and scanned horizontally in the same direction.

In this embodiment, distance data D (m) (m=1 to M) obtained by distance measurement means 4 means a distance to an object 10 existing in the direction scanned by the scan means 8. Therefore, from the angle data θ1 to θM of the scan means 8 in horizontal scanning directions and the distance data D(1) to D(M) output by the distance measurement means 4 in correspondence with these angle data, the location and distance of an object in each horizontal direction can be measured at the same time.

In a scan type distance measurement device such as this, interference detection means 5 stores the distance data D(m) output by distance measurement means 4 over a plurality of consecutive measurements during scan. In the same way as the third embodiment, the interference detection means 5 further calculates from the stored values D(1) to D(M) a statistical fluctuation value such as a standard deviation σD or sum of absolute values of differences between continuous data. And, when a fluctuation in the distance data is greater than a predetermined value, it is determined that interference light exists, and an interference detection signal AL is sent.

In the scan type distance measurement device, an amount of scan for each measurement, i.e., the change value of an angle θm in the direction of measurement is made very small because the location and distance of an object in a wide range are detected with high resolving power. Therefore, one object 10 is measured several times. As described, when the same object 10 is continuously detected, a fluctuation in distance data D(1) to D(M) is small and stable. Therefore, the above-described standard deviation σD, for example, becomes a small value.

However, since the pulsed light which is generated by an opposite distance measurement device and becomes interference light is not sent in synchronization with the distance measurement device of this invention, there is no fixed relationship between the timing at which distance measurement means 4 measures and the timing at which pulsed interference light is incident on light-receiving means 3. Therefore, the distance data D(m) (m=1 to M) calculated by the distance measurement means 4 become random values, and the fluctuation becomes extremely great.

With this phenomenon, the interference detection means 5 stores, for each one scan period, the distance data D(m) (m=1 to M) of the distance measurement means 4 corresponding to the scanning direction θm of the scan means 8, and calculates a fluctuation of distance data in each scanning direction each time one scan is finished. And, when the fluctuation exceeds a predetermined value, it is determined that interference light exists in incident light.

If the interference detection means 5 determines that interference light exists in incident light, data invalidation means 55 will give a data invalidation signal AV to the distance measurement means 4 to make invalid the distance data D(m) obtained by that scan.

Thus, the incident light within a distance measurement time Tφ corresponding to a distance measurable range Dmax causes a mistaken distance calculation, so the distance data calculated at that time is made invalid.

Seventeenth Embodiment

While the above-described sixteenth embodiment has detected the existence of interference light from the fluctuation of distance data D(m) (m=1 to M) obtained by one scan, this embodiment can likewise detect the existence of interference light and a scanning direction θm from the fluctuation of distance data D(m, q)(m=1 to M, q=1 to Q) obtained by a plurality of scans (Q scans), for example, the fluctuation of distance data D(M, q) (q=1 to Q) in the same scanning direction, for example, θM direction.

That is, interference detection means 5 performs Q scans in the horizontal direction, and detects a fluctuation of each of distance data D(1, q), D(2, q), D(3, q), . . . , and D(M, q) (q=1 to Q) for each of angles of the same scanning direction θ1, θ2, . . . , and θM. And, when a fluctuation of distance data D(5, q) (q=1 to Q) in a particular direction, for example, a direction of θ5 is great, it is determined that interference light is incident from that direction, so interference light can be detected with reliability. Of course, the scanning direction may be a one-dimensional direction or a two-dimensional direction.

Eighteenth Embodiment

Interference detection means 5, as with the sixteenth embodiment, stores distance data D(m) (m=1 to M) in each scanning direction each time one scan is finished. And, in a case where an object has not been detected at the central portion of each of the previous scan and the preceding scans, when distance data (other than distance data in the vicinity of the opposite ends (star and end) of a current scan) is output in the vicinity of the central portion of a current scan, i.e., when light-receiving means 3 output a light reception signal J more than a predetermined value, it can be determined that the distance data is based on interference light S.

For example, in a case where this kind of device is mounted in the front of a vehicle and the distance and direction of an obstacle in the traveling direction are measured, generally an object (obstacle) is always far away and the level of the light reception signal appears in a weak state, and the level of the light reception signal is increased as the device comes closer to the object. Also, there is the characteristic that a vehicle passing ahead is detected at the opposite ends of scan at all times.

Therefore, when, at the central portion of scan, the light reception signal J based on the pulsed reflection light from an object has not been detected at the previous measurement and the preceding measurements, it is impossible that an object where the level of the light reception signal J is more than a predetermined value appears suddenly. Therefore, the light reception signal J the light-receiving means 3 outputs at that time is based on interference light S.

And, when interference detection means 5 determines that interference light exists, data invalidation means 55 generates a data invalidation signal AV to invalidate all distance data measured by the current scan of distance measurement means 4.

Nineteenth Embodiment

Scan means 8 is constructed so that it scans, for example, from the right end of the start point of scan to the left end of the end point in one direction and is returned from the end point to the start point for the next scan. And, since a distance does not need to be measured during a return of scan, light-sending means 2 does not generate pulsed light A. In a device thus constructed, incident light G received during a return of scan by light-receiving means 3 is interference light S.

Interference detection means 5 can determine whether interference light exists and specify the direction thereof, by obtaining a light reception signal J from light-receiving means 3 during a return of scan where a distance measurement is not performed and also by obtaining angle data θm from scan means 8. And, when the interference detection means 5 determines that interference light exists, data invalidation means 55 generates a data invalidation signal AV to invalidate distance data which, among distance data measured during a current scan by distance measurement means 4, correspond to angle data θm obtained by scan means 8.

Also, while in the above embodiment the existence of interference light has been detected by the light reception signal J obtained during a return of scan, it is also possible to detect the existence of interference light by the light reception signal obtained for a predetermined time during which the sending of pulsed light is stopped.

Of course, in the sixteenth to nineteenth embodiments described above, the scanning direction may be a one-dimensional or two-dimensional direction. If an object is scanned in the vertical direction thereof, a two-dimensional distance distribution (distance image result of measurement) will be obtained.

Twentieth Embodiment

Figure 12:
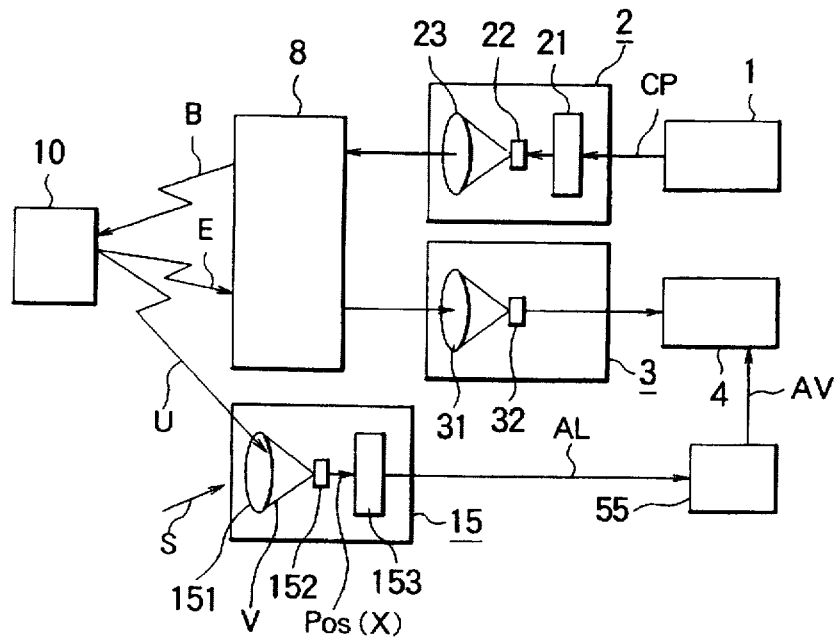
FIG. 12 is a block diagram showing a distance measurement device of a twentieth embodiment of this invention.

FIG. 12 illustrates a distance measurement device constructed in accordance with a twentieth embodiment of this invention. In the figure, reference numerals 1 to 4, 8 and 10 are the same as the sixteenth embodiment shown in FIG. 10. Reference numeral 15 denotes interference detection means, which includes a light-receiving lens 151, a light-receiving element 152, and interference detection circuit 153. Data invalidation means 55 receives an interference detection signal AL from the interference detection means 15 and sends the data invalidation signal AV to the distance measurement means 4 to invalidate distance data.

The focal length of the light-receiving lens 151, together with the light-receiving size of the location detection element 152, is set so that the light-receiving (acceptance) range thereof has a light-receiving. (acceptance) angle θre including a range of scan angle θ1 to θM in which the light beam B generated by light-sending means 2 is scanned by scan means 8.

The location detection element 152 comprises a light-spot type location detection sensor making use of the surface resistance of a photodiode, such as a PSD. The interference detection circuit 153 is constructed so that it detects the existence of interference light by the position Pos(x) of a light spot V condensed on the light-receiving surface of the location detection element 152 and by the angle data θm of the scanning direction of the scan means 8.

Now, if a distance is measured by a scan type distance measurement device using interference detection means 15 having the above-described light-receiving range θre, reflection light E from the object 10 in the scanning direction of the scan means 8 is received by the light-receiving means 3 when there is no source of interference light S. At the same time, pulsed reflection light U from the object 10 is detected by the location detection element 152 of the interference detection means 15.

Therefore, the location detection element 152 outputs position data p(x) as direction data equivalent to the angle data θm of the scanning direction of the light beam B. Then, the interference detection circuit 153 determines whether the angle data θm of the scanning direction and the position data Pos(x) output by the location detection means 152 correspond to each other. If they correspond, it is determined that there is no interference light.

When, on the other hand, interference light S and pulsed reflection light U are incidence at the same time, the position data Pos(x) output by the location detection element 152 of the interference detection means 15 indicates both the position data of the above-described object 10 and the position data of the source of interference light. Therefore, when the position data Pos(x) does not correspond entirely to the scanning direction of the scan means 8, the interference detection circuit 153 determines that interference light exists.

And, when the interference detection circuit 153 determines that interference light exists, data invalidation means 55 generates a data invalidation signal AV to invalidate distance data which, corresponding to the position data Pos(x) among distance data measured by distance measurement means 4, does not correspond to the scanning direction of scan means 8.

When the pulsed reflection light U from the object 10 and interference light S are incident on the location detection element 152 at the same time, the interference light S is far greater in intensity than the reflection light U from the object, because the interference light S is direct light output by a light source of other device. Therefore, since the location detection element 152 outputs the incidence direction of interference light S as position data, the incidence of the interference light and the direction thereof can be detected with reliability.

Twenty First Embodiment

Figure 13:
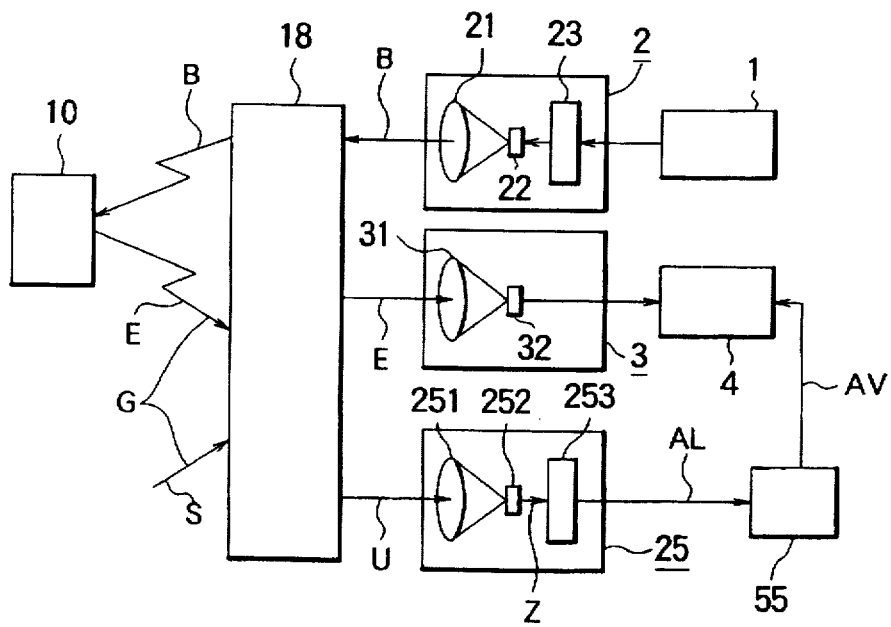
FIG. 13 is a block diagram showing a distance measurement device of a twenty first embodiment of this invention.

FIG. 13 illustrates a distance measurement device constructed in accordance with a twenty first embodiment of this invention. In the figure, reference numerals 1 to 4, 10 and 55 are the same as the twentieth embodiment shown in FIG. 12. Reference numeral 18 denotes scan means, which is constructed so that a light beam B generated by light-sending means 2, incident light E to light-receiving means 3, and incident light U to interference detection means 25 to be described later are scanned at the same time. The interference detection means 25 includes a light-receiving lens 251, a light-receiving element 252, and interference detection circuit 253. Data invalidation means 55 receives an interference detection signal AL from the interference detection means 25 and sends the data invalidation signal AV to the distance measurement means 4 to invalidate distance data. Note that scan means 18 and light-sending means 2 constitute scan light-sending means of this invention.

The angle of field, θre, of the interference detection means 25 defined by the light-receiving lens 251 and the light-receiving element 252 is more than that defined by the light-receiving lens 31 and light-receiving element 32 of light-receiving means 3, and the light-receiving direction of the interference detection means 25 is directed in a direction advanced by a predetermined angle toward the scanning direction of scan means 18 than the light-receiving direction of the light-receiving means 3. That is, the light-receiving direction of the interference detection means 25 is set so that with respect to the light-receiving direction of the light-receiving means 3, it is directed to a next scanning direction or a direction preceding that direction.

Also, the above-described interference detection circuit 253 determines the existence of the incidence of interference light S to the light-receiving element 252, and also determines the existence of interference light in the scanning direction of scan means 18 and the direction thereof.

As described above, the interference detection means 25 is constructed so that it detects the incident light G in a direction advanced to the scanning direction of the scan means 18 by a predetermined angle, i.e., in directions of next measurement and measurements thereafter, and the interference detection means 25 is not directed to the direction where reflection light E from object 10 is received. Therefore, when there is no source of interference light, the light-receiving element 252 does not output a light reception signal Z, and the interference detection circuit 53 determines that there is no interference, since the light reception signal z is not input.

On the other hand, in a case where interference light S exists, when interference detection means 25 is directed to the direction of the interference light by the scan of scan means 18, i.e., when interference light S is incident through the reflecting mirror (not shown) of scan means 18 to interference detection means 25, light-receiving element 252 outputs a light reception signal Z based on the interference light S.

At this time, since light-receiving means 3 is not directed to the direction of a source of interference light, interference light has not been incident. Therefore, when the light-receiving element 252 outputs a light reception signal Z, the interference detection circuit 253 determines that interference light exists.

Further, the interference detection circuit 253 determines that a direction where a difference of angle between the light-receiving directions of the interference detection means 25 and the light-receiving means 3 is added to the scanning direction of the scan means 18 at the time of the detection of this interference light, is the direction of a source of interference light. Data invalidation means 55 invalidates the distance data of that direction, based on the interference detection signal AL from the interference detection circuit 253 and based on the direction data of interference light.

In accordance with the scan type distance measurement devices described in the seventeenth to twenty first embodiments, interference detection means 5, 15, and 25 detects interference light S because the existence of interference light, and the direction thereof can be detected, and among distance data measured by distance measurement means 4, the distance data corresponding to that interference light is made invalid. Therefore, a scan type distance measurement device having no mistaken measurement of distance can be provided according to this invention.

That is, by invalidating the distance data corresponding to the direction of interference light when interference is generated by interference light, the distance data in the incidence direction of interference light can reliably be prevented from being used, and the reliability of distance data is greatly enhanced. Also, since the distance data other than the incidence direction of interference light is not invalidated but can be used effectively, a reduction in the measuring performance of the device can be minimized.

Twenty Second Embodiment

Figure 14:
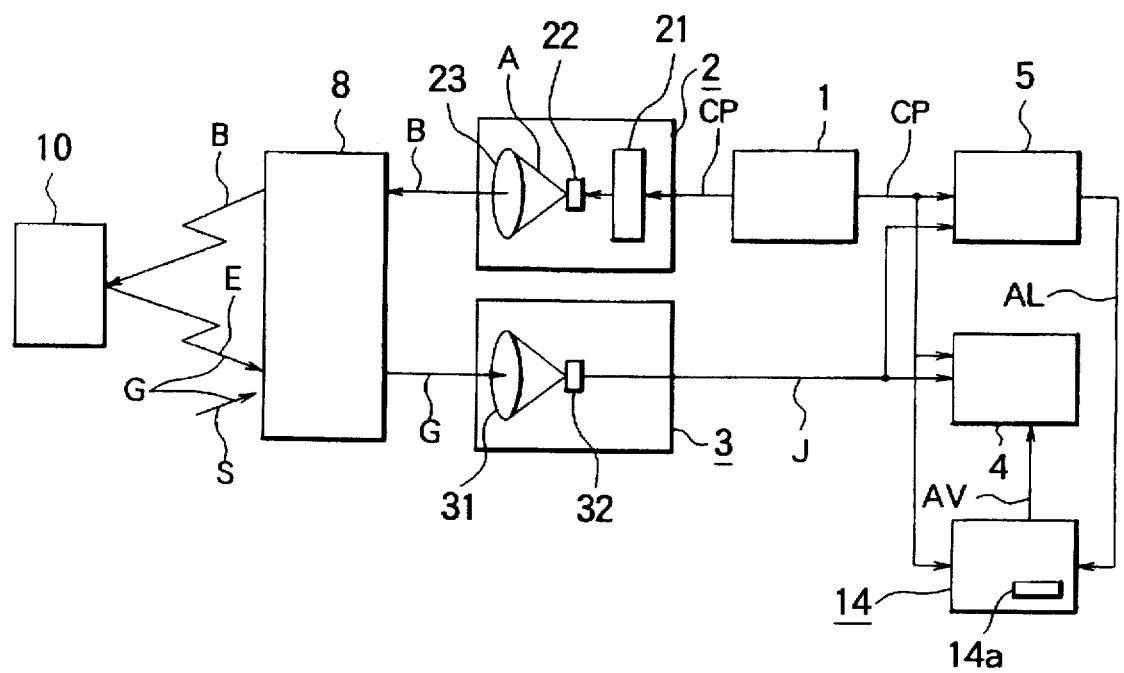
FIG. 14 is a block diagram showing a distance measurement device of a twenty second embodiment of this invention.
Figure 15:
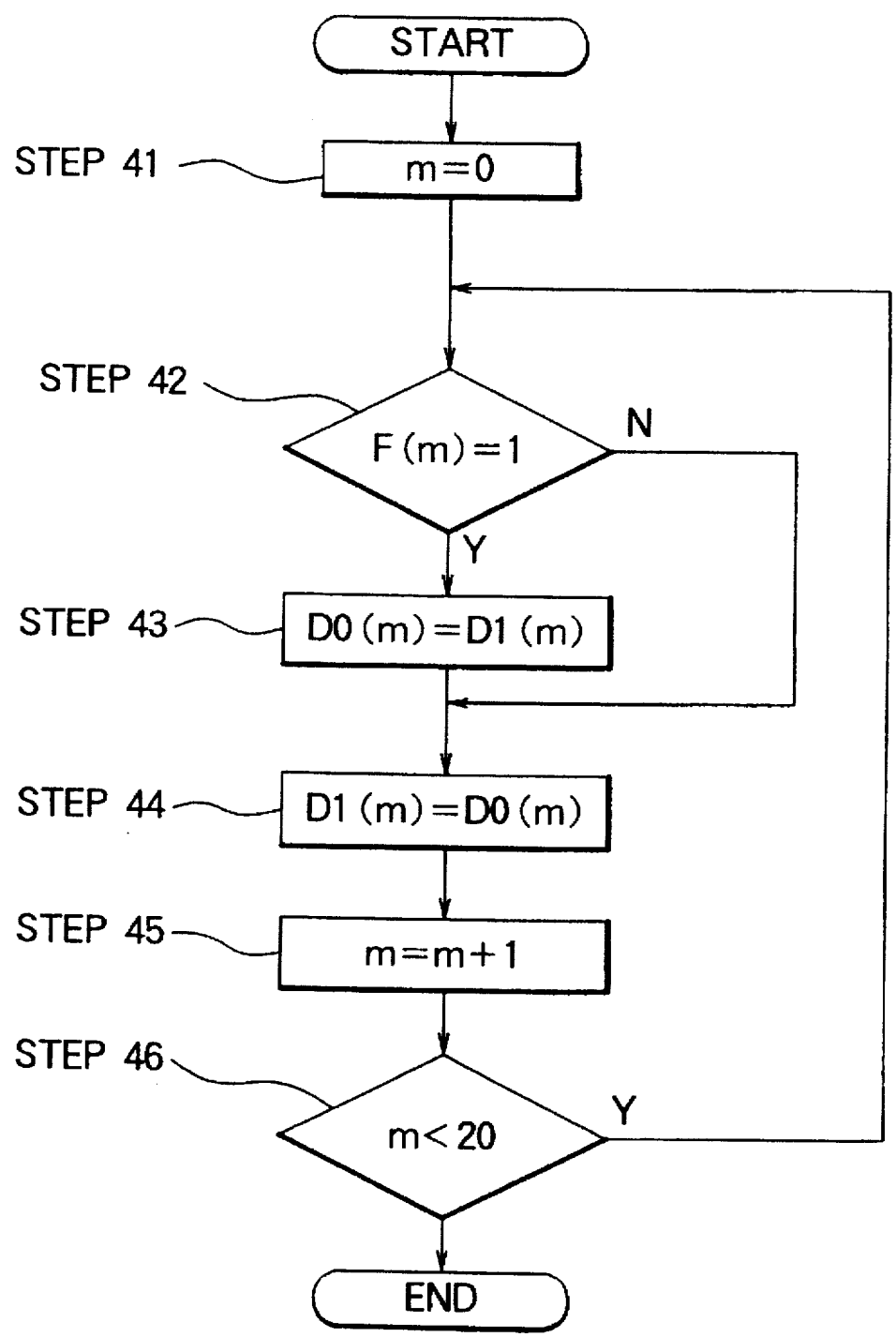
FIG. 15 is a flowchart showing the operation of the twenty second embodiment of this invention.

FIG. 14 is a block diagram showing a distance measurement device of a twenty second embodiment of this invention, and FIG. 15 is a flowchart showing the operation of the embodiment.

In FIG. 14, reference numeral 14 denotes distance data replacement means, which has its display unit 14a. In response to an interference detection signal AL from interference detection means 5, the distance data replacement means 14 replaces the distance data of distance measurement means 4, and that effect is displayed on the display unit 14a. The operation will be described in detail with FIG. 15.

Scan is performed for 20 directions of θ0 to θ19. Current distance data in the respective directions are stored in 20 registers D0(0) to D0(19), and previous distance data in the respective directions are stored in 20 registers D1(0) to D1(19). Also, interference data detected in the way described in the sixteenth to .twenty first embodiments are stored in interference detection flags F(0) to F(19) provided in corresponding directions θ0, to θ19. For example, current distance data in the fourth direction θ3 is stored in D0(3), previous distance data is stored in D1(3), and the interference detection flag is stored in F(3). The storing process of each data is performed after a current distance measurement and an interference detection process are finished.

After such processes are performed, in step 41 the value of a pointer m is set to a 0.

Next, in step 42 it is determined if the interference detection flag F(m) in the direction Φm specified by the pointer m has been set to a 1. When the existence of interference light is not detected in that direction and therefore the interference detection flag F(m) has not been set, step 42 advances to step 44. When the interference detection flag F(m) has been set, step 42 advances to step 43. In step 43, previous distance data D1(m) in that direction is called out by the pointer m and substituted into current distance data D0(m).

In step 44, current distance data D0(m) is substituted into the register D1(m). This is for the next distance measurement.

Next, in step 45 the pointer m is incremented, and in step 46 it is determined if m has reached 20. If m is less than 20, step 46 will return back to step 42 since the data process for all directions has not been finished.

If in step 46, the pointer m has reached 20 and it is determined that the data process for all directions is finished, a series of processes will be ended. With these processes, the distance data in the incidence direction of interference light in the current measurement is not accommodated in a register and is replaced with the previous distance data or the preceding distance data where no interference light exists. If interference light i% incident, mistaken distance data caused by the interference will not be adopted.

Thus, when the incidence of interference light from a specified direction is detected, the distance data in the incidence direction of interference light is invalidated and also the distance data in the same direction during a previous scan is used as current distance data.

Also, previous correct distance data as interference light does not exist is accommodated when interference light is incident. Therefore, when a system uses the distance data of this kind of distance measurement device, the system does not require an additional unit for an incidence of interference light and can use the distance data as it is. Also, that effect is displayed on the display unit 14a.

Twenty Third Embodiment

Figure 16:
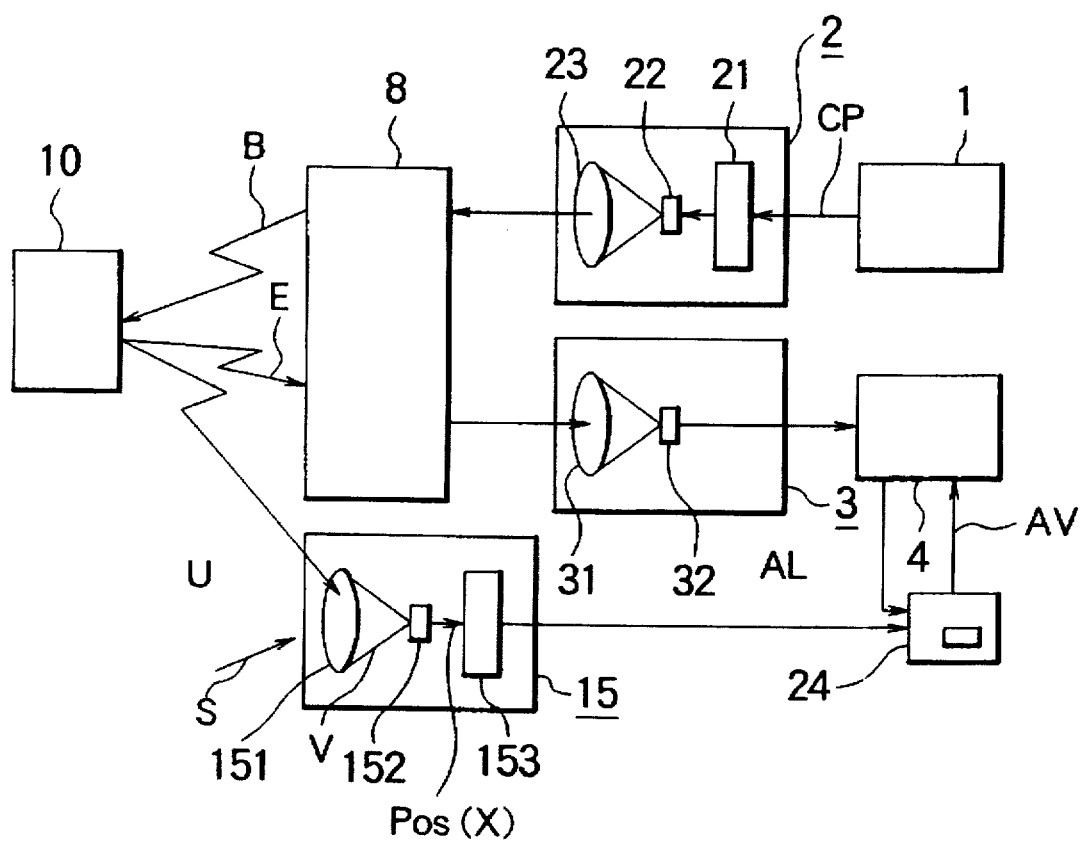
FIG. 16 is a block diagram showing a distance measurement device of a twenty third embodiment of this invention.
Figure 17:
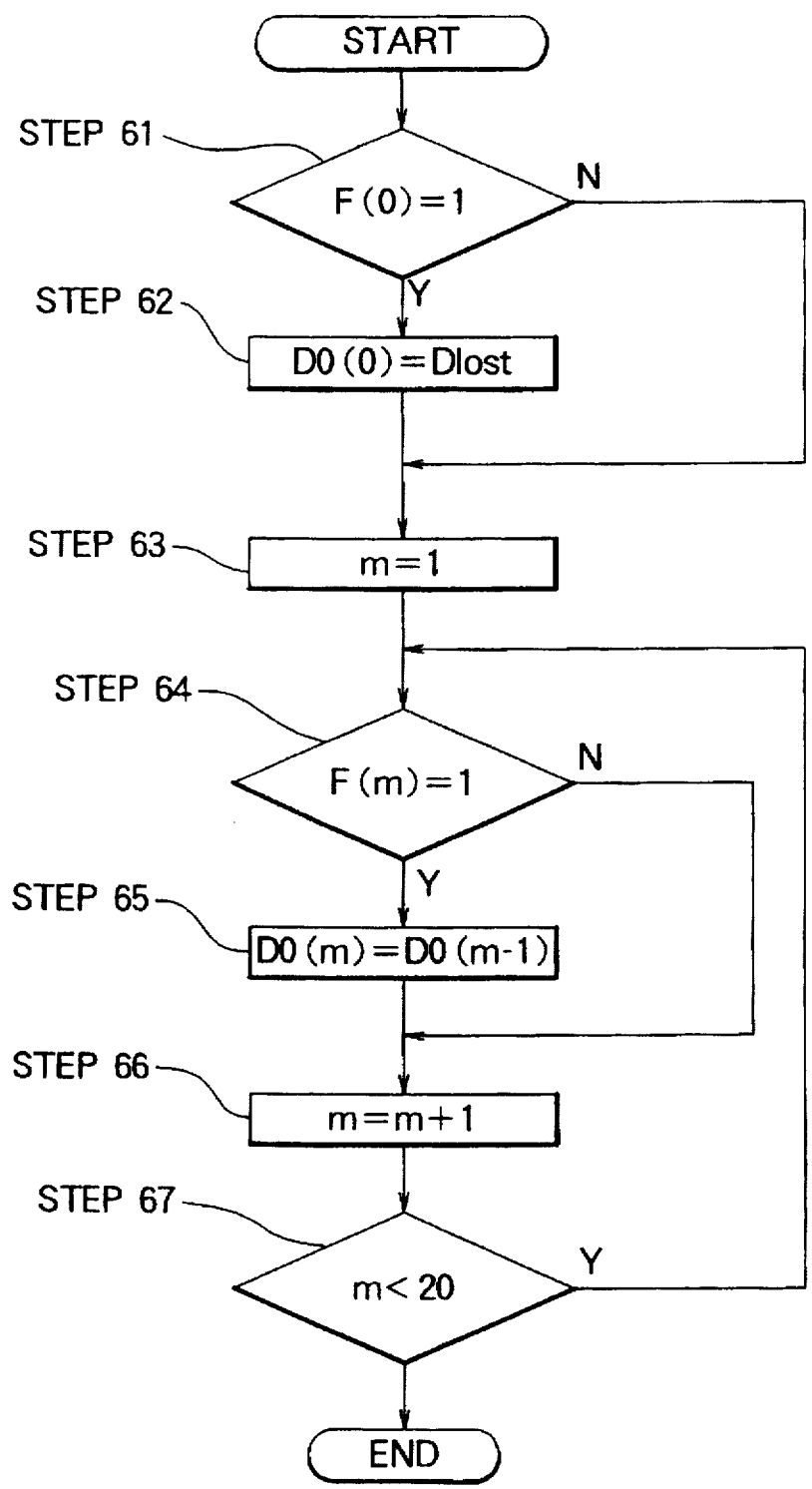
FIG. 17 is a flowchart showing the operation of the twenty third embodiment of this invention.

FIG. 16 illustrates a distance measurement device constructed in accordance with a twenty third embodiment of this invention, and FIG. 17 is a flowchart showing the operation of the embodiment. In FIG. 16, reference numeral 24 denotes distance data interpolation means, which has its display unit 24a. The distance data interpolation means 24 receives an interference detection signal AL from interference detection means 15 and then calculates interpolation data based on the distance data of distance measurement means 4. The calculated interpolation data is supplied to the distance measurement means 4.

Next, the operation will be described with the flowchart of FIG. 17.

Scan is performed for 20 directions of θ0 to θ19. Current distance data in the respective directions are stored in 20 registers D0(0) to D0(19), and interference data are stored in interference detection flags F(0) to F(19) provided in corresponding directions θ0 to θ19.

First, in step 61 it is determined if the interference detection flag F(0) in the direction θ0 has been set to a 1. If the interference detection flag F(0) has not been set, step 61 will advance to step 63. If the interference detection flag F(0) has been set, step will advance to step 62. In step 62, a value (Dlost) greater than the maximum distance measurable range Dmax of the distance measurement device is substituted as a value representative of an object-undetected state into the distance data D0(0) in the direction θ0. Then, step will advance to step 63. Since it cannot be determined if adjacent data has a correct value where there is no interference, there is the possibility that the substitution of adjacent data causes mistaken distance data to be substituted. Step 62 is provided to prevent that possibility.

Next, in step 63 the value of the pointer m is set to a 1.

In step 64, it is determined if the interference detection flag F(m) in the direction em specified by the point m (=1) has been set. When the existence of interference light is not detected in that direction em and therefore the interference detection flag F(m) has not been set, step 64 advances to step 66. When the interference detection flag F(m) has been set, step 64 advances to step 65. In step 65, distance data D0(m−1) adjacent to that direction is called out by the pointer m and substituted into current distance data D0(m). Then step will advance to step 66.

In step 66 the pointer m is incremented, and in step 67 it is determined if m has reached 20. If m is less than 20, step 67 will return back to step 64 since the data process for all directions has not been finished.

If in step 67, the pointer m has reached 20 and it is determined that the data process for all directions is finished, a series of processes will be ended. With these processes, the distance data in the incidence direction of interference light in the current measurement is ignored and is replaced with the adjacent distance data where no interference light exists. Even if interference light were incident, there could be realized a scan type distance measurement device where mistaken distance data based on interference is not output.

Also, when necessary, the effect that distance data in the incidence direction of interference light was ignored and replaced with adjacent distance data where no interference light exists is displayed on the display unit 24a.

Twenty Fourth Embodiment

Figure 18:
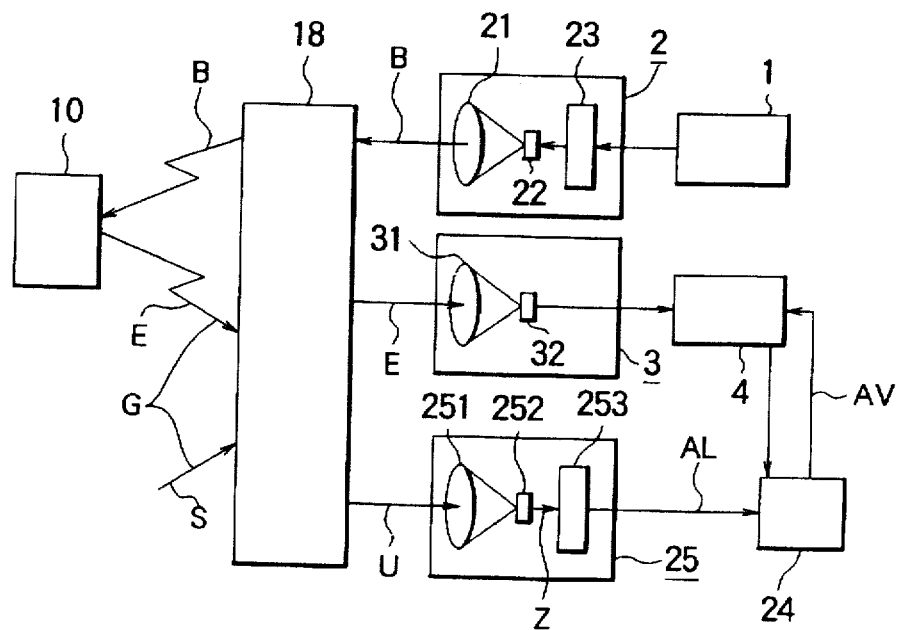
FIG. 18 is a block diagram showing a distance measurement device of a twenty fourth embodiment of this invention.

FIG. 18 illustrates a distance measurement device constructed in accordance with a twenty fourth embodiment of this invention. As shown in FIG. 18, even if the data interpolation means 24 shown in FIG. 16 were provided in the embodiment shown in FIG. 13, the same advantage as the above-described twenty third embodiment would be obtained.

Twenty Fifth Embodiment

In the above-described twenty third embodiment (FIGS. 16 and 17), distance data in an adjacent direction was used as distance data in the incidence direction of interference light. However, if data in a plurality of adjacent directions are averaged or weighted and data in the incidence direction of interference light is interpolated, data interpolation can be made with high reliability.

Twenty Sixth Embodiment

Figure 19:
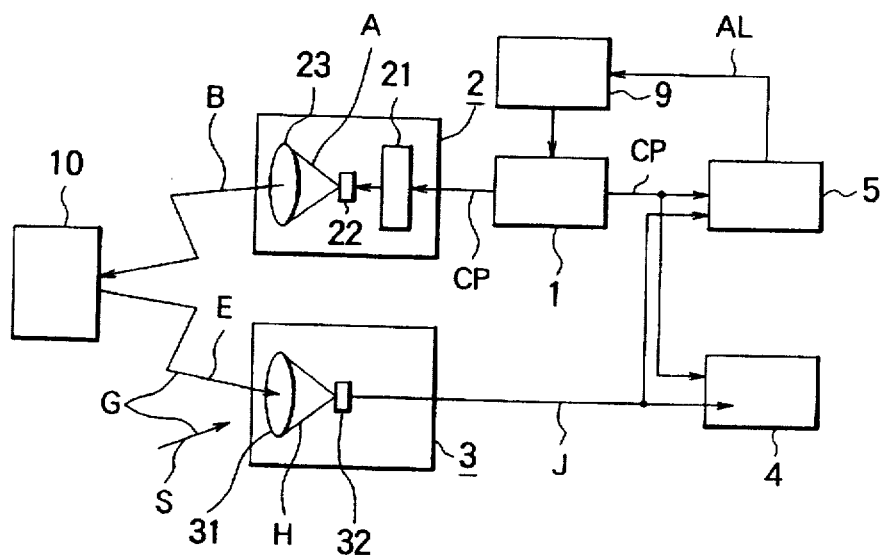
FIG. 19 is a block diagram showing a distance measurement device of a twenty sixth embodiment of this invention.
Figure 20:
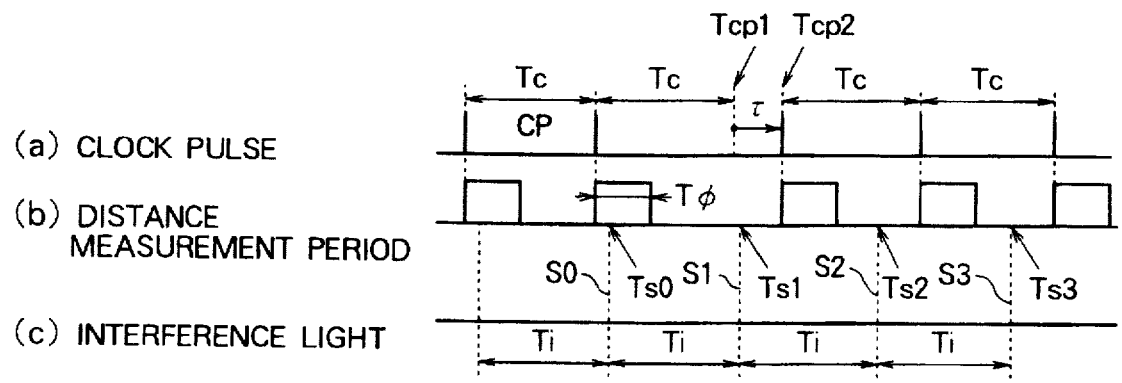
FIG. 20 is a diagram used to explain the operation of the distance measurement device of the twenty sixth embodiment of this invention.

FIG. 19 is a block diagram showing a distance measurement device of a twenty sixth embodiment of this invention, and FIG. 20 is a diagram used to explain the operation of the distance measurement device. In these figures, reference numerals 1 to 5 are the same as the embodiment shown in FIG. 1. Reference numeral 9 denotes interference avoidance means, which receives an interference detection signal AL from interference detection means 5 and then delays the clock pulse generation timing Tc of clock pulse generation means i by a predetermined time.

The operation of the distance measurement device thus constructed will be described with FIG. 20. FIG. 20(a) shows the generation timing of a clock pulse, FIG. 20(b) shows a period of distance measurement, and FIG. 20(c) shows the incidence timing of interference light. If interference detection means 5 detects interference light S0 (FIG. 20(c)) that is incident between the timing of a clock pulse CP that generates at intervals of Tc and a distance measurement period Tφ of FIG. 20(b), and then outputs an interference detection signal AV, interference avoidance means 9 will delay according to the interference detection signal AL the next clock pulse generation timing of clock pulse generation means 1 from a point of Tcp1 to a point of Tcp2 by a predetermined time τ (FIG. 20(a)).

In a case where a plurality of distance measurement devices of the same kind are used, the generation timing Tc of a clock pulse is delayed by a predetermined time τ since the occurrence period Ti of interference light and the clock pulse generation period Tc of the distance measurement device in this embodiment are substantially the same. Therefore, since interference light (S1 to S3) is not within the distance measurement period Tφ, as shown by Ts1 to Ts3, a mistaken distance measurement by interference can be prevented.

While in the above embodiment the generation timing Tc of the clock pulse CP has been delayed to avoid interference, the clock pulse generation timing may be quickened to avoid interference.

Also, if a time for quickening or delaying a clock pulse generation timing is set to more than the above-described distance measurement period Tφ equivalent to a distance measurable range Dmax, interference from devices of the same kind can be avoided.

Twenty Seventh Embodiment

Figure 21:
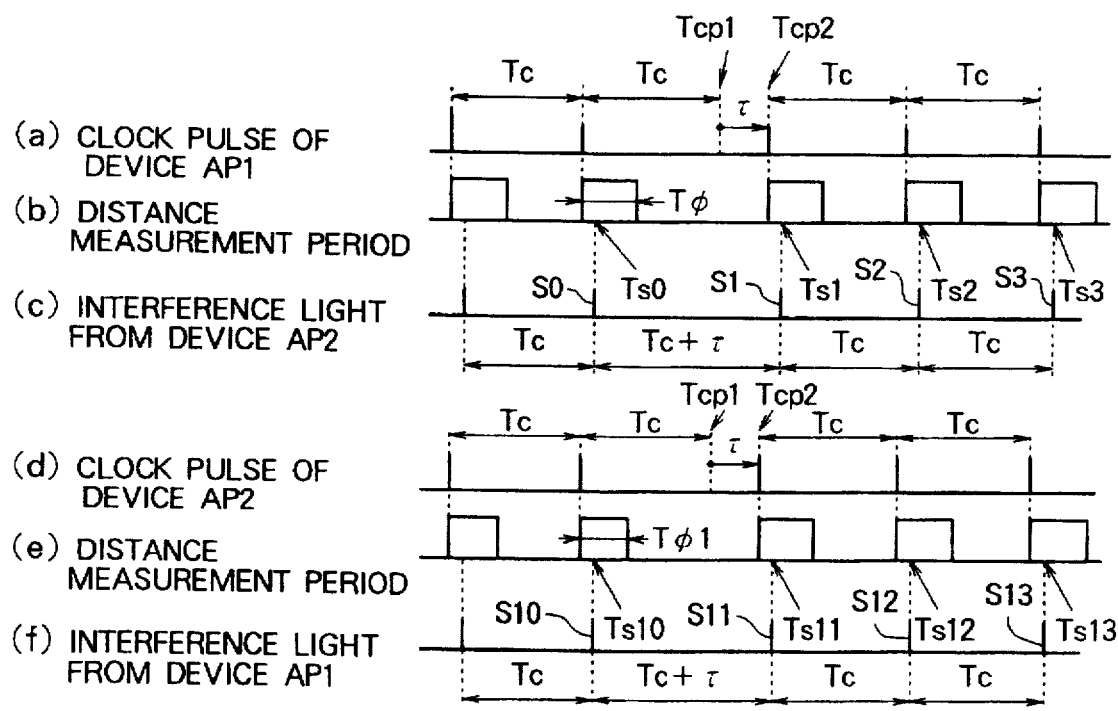
FIG. 21 is a diagram used to explain the operation of a distance measurement device of a twenty seventh embodiment of this invention.

Incidentally, when a plurality of devices according to the embodiment of FIG. 19 are used, there is the possibility that interference light beams are mutually detected at the same time and the respective clock pulse generation timings are changed at the same time. In such case, devices AP1 and AP2 are to change their clock pulse generation timings by the same period τ, as shown in FIG. 21. Therefore, like a case where timing is not changed, the interference light (S1 to S3) from the device AP2 exists within the distance measurement period Tφ of the device AP1, so there are some cases where interference cannot be avoided. To avoid interference in a state such as this, a time for quickening or delaying the above-described clock pulse generation timing Tc is set to a random value.

Figure 22:
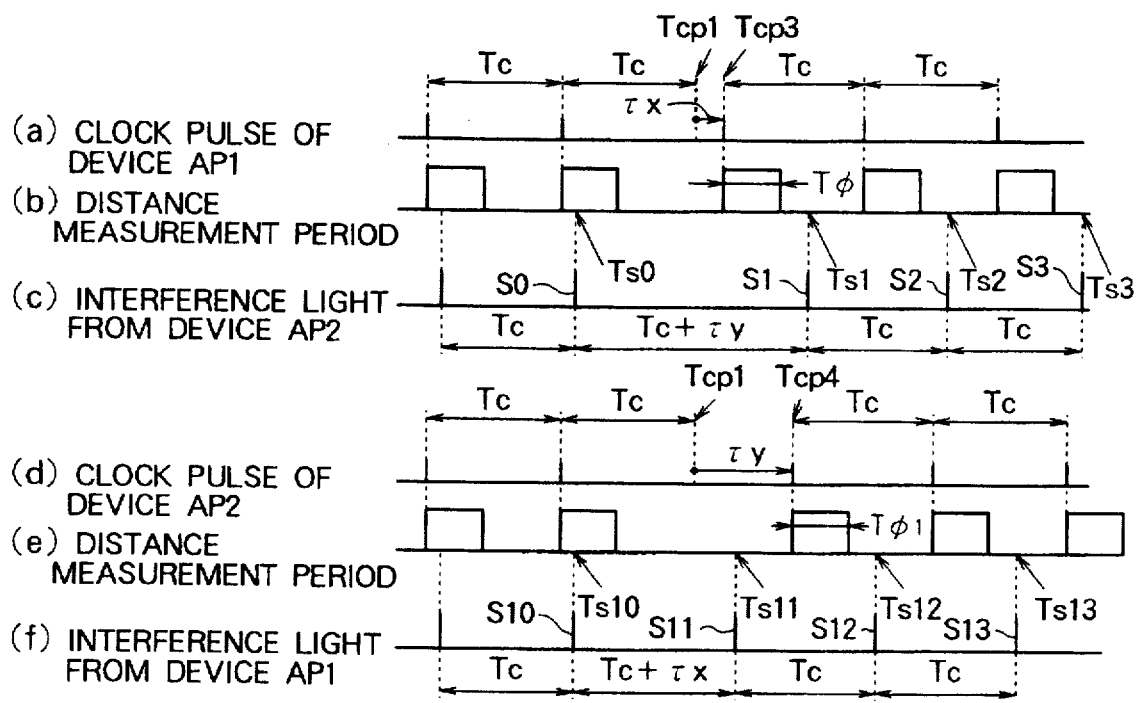
FIG. 22 is a diagram used to explain the operation of the distance measurement device of the twenty seventh embodiment of this invention.

FIG. 22 is a diagram used to explain the operation of the distance measurement device of this embodiment. FIG. 22(a) shows the clock pulse generation timing of the device AP1, FIG. 22(b) shows the distance measurement period of the device AP1, and FIG. 22(c) shows the incidence timing of interference light of the device AP1. FIG. 22(d) shows the clock pulse generation timing of the device AP2, FIG. 22(e) shows the distance measurement period of the device AP2, and FIG. 22(f) shows the incidence timing of interference light of the device AP2. If the device AP1 detects interference light S0 from the device AP2 (FIG. 22(c)), the generation timing of a clock pulse will be delayed from a point of Tcp1 to a point of Tcp3 by a predetermined time τx (FIG. 22(a)). On the other hand, the device AP2 delays the generation timing of a clock pulse from a point of Tcp1 to a point of Tcp4 by a predetermined time τy (FIG. 22(d)). These change quantities of time τx and τy are selected to be random values. These random values are generated by using the value of a timer incorporated in a microcontroller or various methods, and a description thereof is omitted.

If the change quantities of time τx and τy are random values, there is a very little possibility that they become the same value. If clock pulse generation timings are changed, the clock pulse generation timings thereafter will be different from each other and, as shown in FIG. 21(c), the interference light (S1 to S3) from the device AP2 will not be incident within the distance measurement period Tφ of the device. Also, as shown in FIG. 22(e), the interference light (S11 to S13) from the device AP1 will not be incident within the distance measurement period Tφ1 of the device AP2, so interference does not occur.

Thus, even when devices which become sources of interference light are the same kind, interference light beams are mutually detected at the same time, and the respective clock generation timings are changed at the same time, change quantities of time are different from each other, so the measurements thereafter are started at different timings and the devices can be prevented from being subjected to interference again.

Twenty Eighth Embodiment

Figure 23:
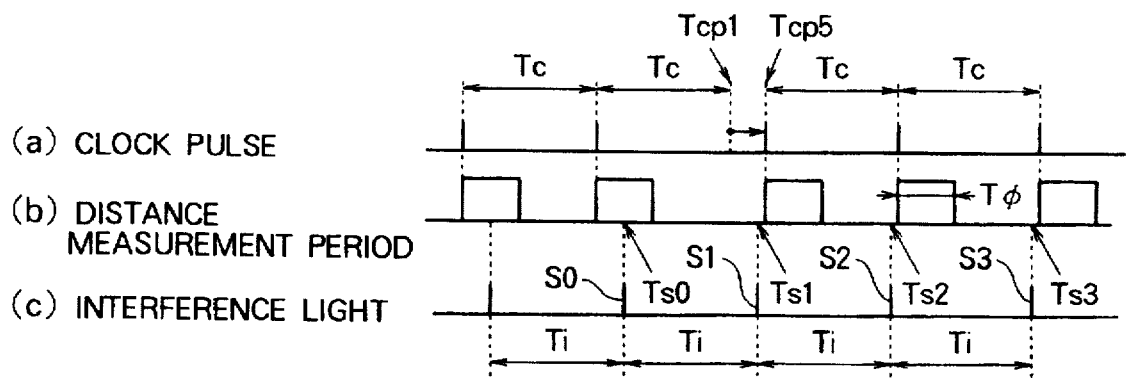
FIG. 23 is a diagram used to explain the operation of a distance measurement device of a twenty eighth embodiment of this invention.

Interference detection means 5 is constructed so that it detects the interference light within the distance measurement period Tφ and also detects the incidence of interference light at all times like the first embodiment (FIG. 1). In a case where, as shown in FIG. 23, the interference detection means 5 detects interference light S0 (FIG. 23(c)), if interference avoidance means 9 shifts according to an interference detection signal AV the clock pulse generation timing of clock pulse generation means 1 from a point Tcp1 to the same timing as the detection of interference light, i.e., to the point of Tcp5 immediately after the incidence timing of interference light (FIG. 23(a)), a measurement of distance will be performed at all times after interference light (S1 to S3) is incident (FIG. 23(b)). As a result, a mistaken measurement is avoided with reliability.

Twenty Ninth Embodiment

Also, the timing t at which interference light is incident is calculated in the same way as that described in the eighth embodiment (FIGS. 4 and 5), and the clock pulse generation timing of interference detection means 5 can also be changed so that interference light is not incident during measurement.

Figure 24:
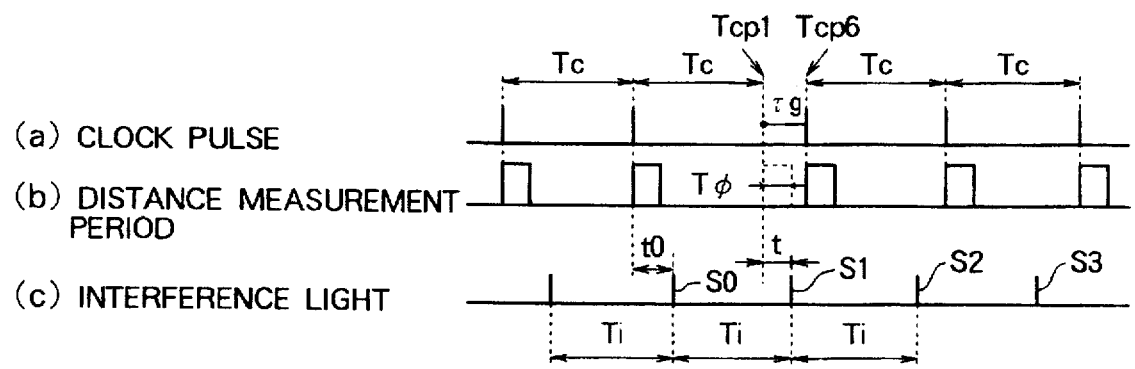
FIG. 24 is a diagram used to explain the operation of a distance measurement device of a twenty ninth embodiment of this invention.

FIG. 24 is a diagram used to explain the operation of this embodiment. FIG. 24(a) shows the generation timing of a clock pulse, FIG. 24(b) shows the distance measurement period, and FIG. 24(c) shows the incidence timing of interference light. Interference detection means 9 detects the generation timing t0 of interference light S and the distance measurement period Ti thereof (FIG. 24(c)). Next, distance measurement means 4 calculates, from the clock pulse period Tc, previous incidence timing t0 of interference light, and generation period Ti of interference light S obtained by interference detection means 5, the incidence timing t (t=t0+Ti−Tc) of interference light for the next measurement.

When, at the time of the next measurement, it is predicted that next interference light is incident between the next clock pulse generation timing and the distance measurement period Tφ equivalent to the distance measurable range of the device, interference avoidance means 9 delays the clock pulse generation timing of clock pulse generation means 1 from a point of Tcp1 to a point of Tcp6 by a predetermined time τz so that interference light S is not incident within the distance measurement period Tφ. Therefore, since the incidence timing of interference light (S1 to S3) is not within the distance measurement period Tφ, predicted incidence timing of interference light S can be avoided and therefore a measurement of distance can be performed with reliability.

With this, in a case where, as in the case of sources of interference light of the same kind, the generation period of interference light is the same as the generation period of a clock pulse, and in the case of light sources different in period of generation, a mistaken distance measurement by interference can be prevented.

If interference is avoided in the way described above, the sending-light timing of other distance measurement devices which, at the same time, become a source of interference light will be shifted from the incidence timing of a light beam of the distance measurement device of the present invention. Therefore, a chance of interference is reduced, and the device of this invention becomes a device which hardly gives interference to other devices.

Further, even if the interference avoidance means 9 described in the twenty sixth to seventy ninth embodiments is used in a distance measurement device using interference detection means 5 described in the tenth to fifteenth embodiments or in the above-described scan type distance measurement devices described in the sixteenth to twenty first embodiments, the same effect can be obtained.

Thirtieth Embodiment

Figure 25:
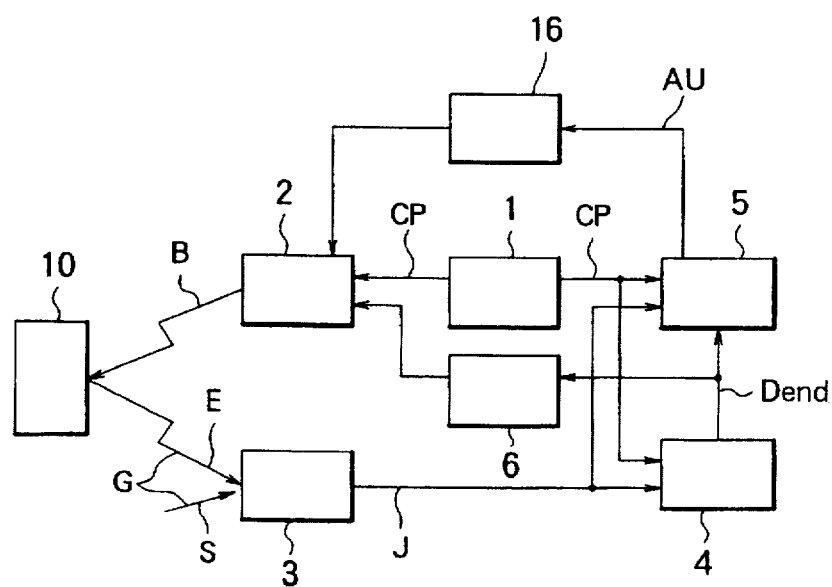
FIG. 25 is a block diagram showing a distance measurement device of a thirtieth embodiment of this invention.

FIG. 25 illustrates a distance measurement device constructed in accordance with a thirtieth embodiment of this invention. In the figure, reference numeral 16 denotes light-sending prohibition means. Since other members are the same as those shown in FIG. 1, the same reference numerals are applied and a description thereof is omitted. The light-sending prohibition means 16 receives an interference detection signal AL from interference detection means 5, when the interference detection means 5 detects the existence of interference light, and then prohibits light-sending means 2 from generating pulsed light A. With this, the safety of a laser beam that is sent by the device of the present invention can be increased. For example, when there is a vehicle in which a device, which becomes a source of interference light, is mounted at a position opposite to the distance measurement device of the present invention, the pulsed light from the device of the present invention is irradiated to the driver of that vehicle. However, since interference detection means 5 detects the incidence of interference light from the source of interference light and light-sending prohibition means 16 prohibits the sending of pulsed light after that detection, the irradiation of a laser beam to the driver of an opposite vehicle can be minimized. Therefore, there can be obtained a safe distance measurement device which is capable of preventing radiation sickness that is caused by the irradiation of laser beams.

Since interference detection means 5 does not detect interference light if a source of interference light disappears, the prohibition of generation of pulsed light by light-sending prohibition means 16 is released. Therefore, if light-sending means 2 again generates pulsed light, the distance measurement device can measure a distance. It is noted that the above-described light-sending prohibition means 16 may be provided in the eleventh to thirteenth embodiments to prohibit the sending of pulsed light when interference detection means 5 determines that interference light exists.

Thirty First Embodiment

Figure 26:
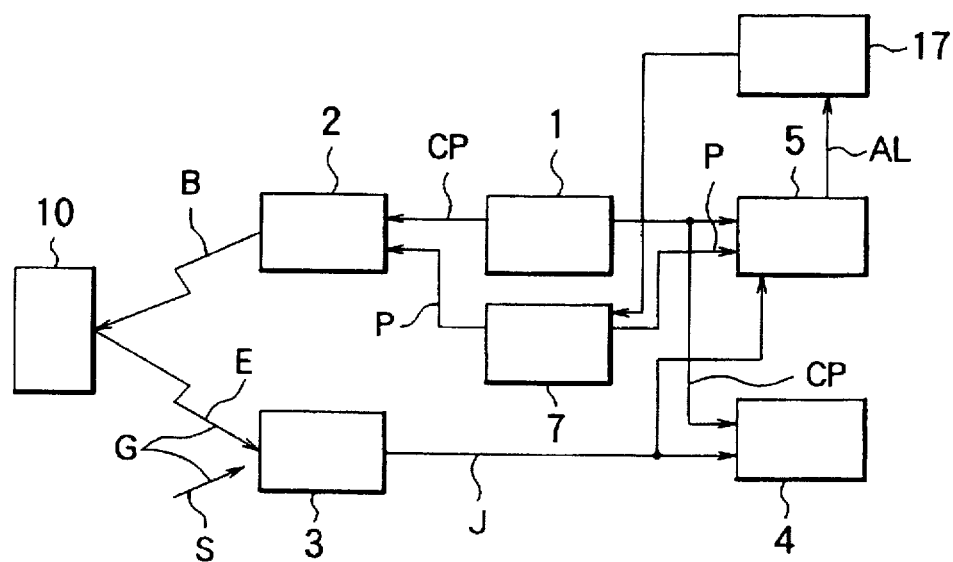
FIG. 26 is a block diagram shoving a distance measurement device of a thirty first embodiment of this invention.

FIG. 26 illustrates a distance measurement device constructed in accordance with a thirty first embodiment of this invention. In this embodiment, there is provided light-sending output reducing means 17 which is light-sending limit means. When interference detection means 5 detects interference light S, light-sending output control means 7 is controlled so that the output of pulsed light A generated by light-sending means 2 is reduced. With this arrangement, there can be obtained a safe distance measurement device which is capable of reducing an amount of laser beam that a person using a device which becomes a source of interference light is subjected to.

Thirty Second Embodiment

Figure 27:
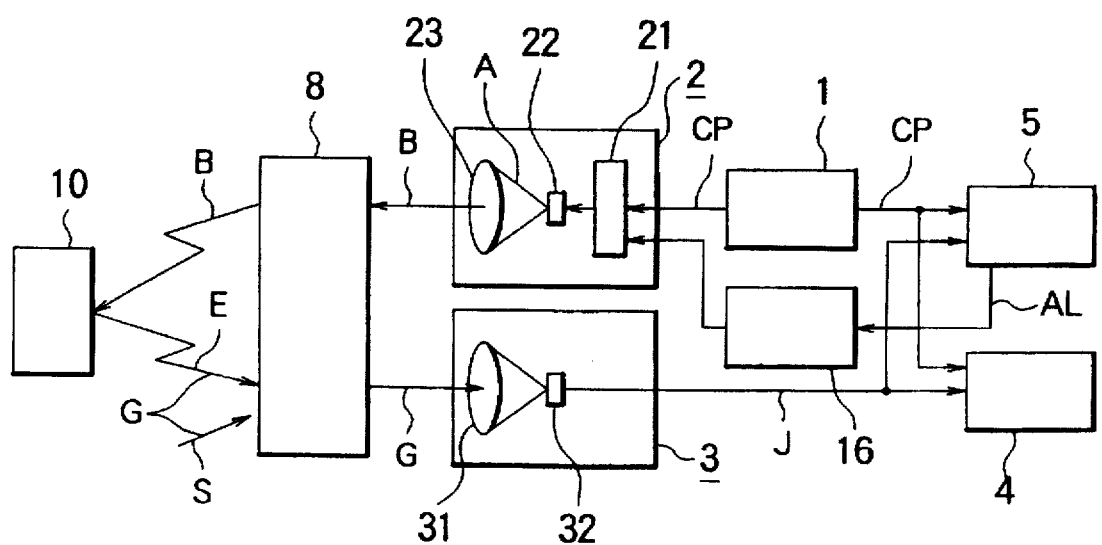
FIG. 27 is a block diagram showing a distance measurement device of a thirty second embodiment of this invention.

FIG. 27 illustrates a distance measurement device constructed in accordance with a thirty second embodiment of this invention. In this embodiment, light-sending prohibition means 16 is added to the device shown in FIG. 10. The light-sending prohibition means 16 which is light-sending limit means receives an interference detection signal AL from interference detection means 5, when the interference detection means 5 detects the existence of interference light, and then prohibits light-sending means 2 from generating pulsed light A, stops a light beam B, or reduces the output of the pulsed light, Therefore, there can be obtained a safe scan type distance measurement device.

Thirty Third Embodiment

Figure 28:
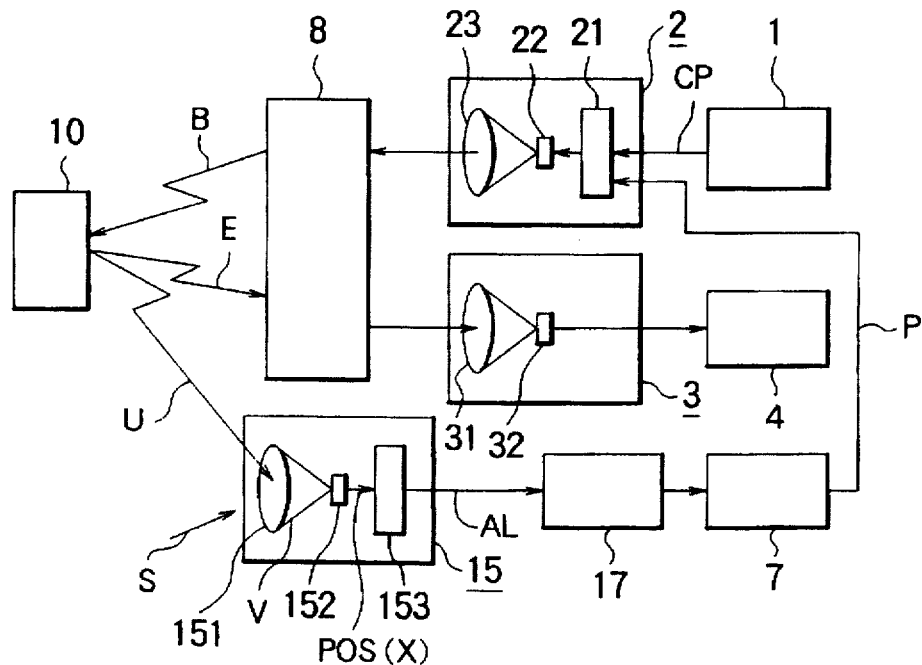
FIG. 28 is a block diagram showing a distance measurement device of a thirty third embodiment of this invention.
Figure 29:
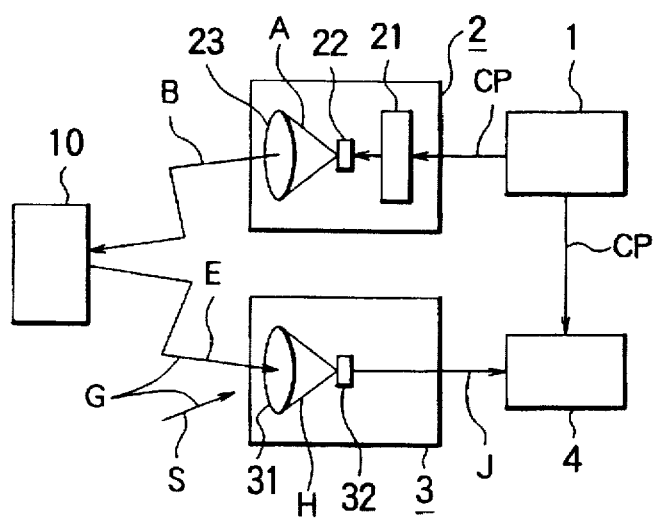
FIG. 29 is a block diagram showing a conventional distance measurement device.

FIG. 28 illustrates a distance measurement device constructed in accordance with a thirty third embodiment of this invention. In this embodiment, light-sending output reducing means 17 is added to the device shown in FIG. 12. The light-sending output reducing means 17 receives an interference detection signal AL from interference detection means 5, when the interference detection means 5 detects the existence of interference light, and then prohibits light-Sending means 2 from generating pulsed light A, stops a light beam B, or reduces the output of the pulsed light. Therefore, there can be obtained a safe scan type distance measurement device.

That is, if the light-sending prohibition means 16 or light-sending output reducing means 17 stops the sending of the light beam B or reduces the light-sending output when interference is generated by interference light, the strong irradiation of light beams to a source of interference light will disappear. The irradiation of laser beams to a person using a device which becomes a source of interference light can be minimized, and the radiation sickness that is caused by the irradiation of laser beams can be prevented. Also, there can be realized a scan type distance measurement device which can safely perform measurements in other directions as usual and which is not reduced in performance even at the time of interference.

Particularly, in a scan type distance measurement device, the pulsed light generated by light-sending means 2 is sharp in directivity and high in luminous intensity in order to enhance the position (angle) resolving power in the scanning direction, so the irradiation of laser beam to human body needs to be minimized. Since the irradiation of laser beams to a person using a device which becomes a source of interference light can be minimized in accordance with the present invention, there can be provided an extremely safe scan type distance measurement device.

While the subject invention has been described with reference to the preferred embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A distance measurement device comprising:
   light-sending means for sending pulsed light toward an object of measurement where a distance thereto is measured;
   light-receiving means for receiving incident light including pulsed reflection light reflected by said object;
   distance measurement means for measuring the time from the sending of said pulsed light to the receiving of said incident light and calculating the distance to said object; and
   interference detection means for determining whether interference light exists in said incident light, based on the intensity of said incident light;
   wherein said interference detection means determines whether interference light exists in said incident light, by comparing the intensity of said incident light with a set value preset according to a distance.

2. A distance measurement device comprising:
   light-sending means for sending pulsed light toward an object of measurement where a distance thereto is measured;
   light-receiving means for receiving incident light including pulsed reflection light reflected by said object;
   distance measurement means for measuring the time from the sending of said pulsed light to the receiving of said incident light and calculating the distance to said object; and interference detection means for determining whether interference light exists in said incident light, based on the intensity of said incident light;

wherein said interference detection means stores a plurality of distance data measured by said distance measurement means and a plurality of intensity data of incident light corresponding to said plurality of distance data, and determines whether interference light exists in said incident light, based on fluctuations in said distance data and said intensity data of said incident light.

3. A distance measurement device comprising:

light-sending means for sending pulsed light toward an object of measurement where a distance thereto is measured;

light-receiving means for receiving incident light including pulsed reflection light reflected by said object;

distance measurement means for measuring the time from the sending of said pulsed light to the receiving of said incident light and calculating the distance to said object; and interference detection means for determining whether interference light exists in said incident light, based on the intensity of said incident light;

wherein said interference detection means determines whether interference light exists in said incident light, by detecting from said pulsed light sent by said light-sending means the intensity of said incident light after a distance measurement time equivalent to a distance measurable range of said distance measurement means.

4. A distance measurement device comprising:

light-sending means for periodically sending pulsed light toward an object of measurement where a distance thereto is measured;

light-receiving means for receiving incident light including pulsed reflection light reflected by said object;

distance measurement means for measuring the time from the sending of said pulsed light to the receiving of said incident light to obtain time data and calculating the distance to said object to obtain distance data; and interference detection means for determining whether interference light exists in said incident light, by detecting, from excess time data which exceeds a predetermined time among said time data, the periodicity of the excess time data.

5. The distance measurement device as set forth in claim 4, which further comprises data invalidation means for calculating, based on the incident timing and occurrence period of incident light when determined as interference light by said interference detection means, a chance that the interference light overlaps the pulsed reflection light from the sending of said pulsed light of the light-sending means, within a predetermined time, and for making invalid distance data obtained when the interference light overlaps the pulsed reflection light.

6. A distance measurement device comprising:

light-sending means for periodically sending pulsed light toward an object of measurement where a distance thereto is measured, wherein timing of the sending of said pulsed light is synchronized with a clock pulse;

light receiving means for receiving incident light including pulsed reflection light reflected by said object;

distance measurement means for measuring the time from the sending of said pulsed light to the receiving of said incident light and calculating the distance to said object;

light-sending stop means for stopping the sending of the pulsed light at least by the next light-sending timing after the distance measurement by said distance measurement means; and interference detection means for determining whether interference light exists in said incident light, based on incident light that is incident on said light-receiving means between said next light-sending timing at which the sending of the pulsed light of the light-sending means is stopped by said light-sending stop means and the next after the next light-sending timing at which the sending of the pulsed light is restarted.

7. The distance measurement device as set forth in claim 6, wherein said interference detection means determines that interference light exists in the incident light, when the incident light is incident on said light-receiving means between said next light-sending timing at which the sending of the pulsed light of the light-sending means is stopped by said light-sending stop means and the next after the next light-sending timing at which the sending of the pulsed light is restarted.

8. The distance measurement device as set forth in claim 6, wherein said interference detection means stores as intensity data of incident light the intensity of incident light of said light-receiving means obtained at the time of the distance measurement of said distance measurement means, compares said intensity data of the incident light with the intensity of incident light that is incident on said light-receiving means between said next light-sending timing at which the sending of the pulsed light of the light-sending means is stopped by said light-sending stop means and the next after the next light-sending timing at which the sending of the pulsed light is restarted, and determines whether interference light exists in the incident light.

9. The distance measurement device as set forth in claim 6, wherein said light-sending stop means stops the sending of said pulsed light, and said interference detection means determines whether interference light exists in the incident light, based on whether there is the periodicity of incident light that is incident on said light-receiving means between said next light-sending timing at which the sending of the pulsed light of the light-sending means is stopped by said light-sending stop means and the next after the next light-sending timing at which the sending of the pulsed light is restarted.

10. A distance measurement device comprising:

light-sending means for sending pulsed light toward an object of measurement where a distance thereto is measured;

light-sending output control means for controlling an output of said pulsed light;

light-receiving means for receiving incident light including pulsed reflection light reflected by said object;

distance measurement means for measuring the time from the sending of said pulsed light to the receiving of said incident light and calculating the distance to said object; and interference detection means for storing the intensity of said pulsed light and the intensity of said incident light as intensity data of said pulsed light and intensity data of said incident light, and for determining whether interference light exists in said incident light, based on said intensity data of said pulsed light and said intensity data of said incident light as the output of said pulsed light is changed by said light-sending output control means.

11. The distance measurement device as set forth in claim 10, wherein said interference detection means determines that interference light does not exist in the incident light, when the intensity of the incident light is increased and decreased as the intensity of the pulsed light is increased and decreased.

12. A distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by said object;

distance measurement means for measuring the time from the sending of said pulsed light to the receiving of said incident light and calculating the distance to said object in said each scanning direction as distance data; and interference detection means for determining whether interference light exists in said reflection light, based on the intensity data and distance data of said incident light;

wherein said interference detection means determines whether interference light exists in said incident light, based on a fluctuation in distance data in one scan.

13. A distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by said object;

distance measurement means for measuring the time from the sending of said pulsed light to the receiving of said incident light and calculating the distance to said object in said each scanning direction as distance data; and interference detection means for determining whether interference light exists in said reflection light, based on the intensity data and distance data of said incident light;

wherein said interference detection means determines whether interference light exists in said reflection light, by calculating, for each direction, a fluctuation in distance data obtained by a plurality of scans.

14. A distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by said object;

distance measurement means for measuring the time from the sending of said pulsed light to the receiving of said incident light and calculating the distance to said object in said each scanning direction as distance data; and interference detection means for determining whether interference light exists in said reflection light, based on the intensity data and distance data of said incident light;

wherein said interference detection means determines whether interference light exists in said incident light, based on intensity or distance data of reflection light in an end of horizontal scan and in the vicinity of a central portion, among distance data obtained by a plurality of scans.

15. A distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by said object;

distance measurement means for measuring the time from the sending of said pulsed light to the receiving of said incident light and calculating the distance to said object in said each scanning direction as distance data; and interference detection means for determining whether interference light exists in said reflection light, based on the intensity data and distance data of said incident light;

wherein said scan light-sending means stops the sending of the pulsed light for a predetermined time during a scan, and said interference detection means determines whether interference light exists in said incident light, based on incident light that is incident on said light-receiving means during the stop of the sending of the pulsed light.

16. The distance measurement device as set forth in claim 15, wherein said scan light-sending means stops the sending of the pulsed light during a return of a scan.

17. A distance measurement device comprising:

scan light-sending means for sending pulsed light toward an object of measurement where a distance thereto is measured, while scanning a predetermined range in a one-dimensional or two-dimensional direction;

light-receiving means for receiving incident light including pulsed reflection light reflected in each scanning direction by said object;

distance measurement means for calculating based on the time from the sending of said pulsed light to the receiving of said incident light and based on said scanning direction, a direction of said incident light and also the distance to said object in said direction of said incident light as distance data; and interference detection means for determining whether interference light exists in said incident light, based on a direction of light that is incident from a range of acceptance angle covering the scan range of said scan light-sending means and based on said direction of said incident light.

18. The distance measurement device as set forth in claim 17, which further comprises data invalidation means for making invalid distance data corresponding to an incident direction of interference light, when said interference detection means determines that the interference light exists in incident light.

19. A distance measurement device comprising:

scan light-sending means for sending pulsed light toward an object of measurement where a distance thereto is measured, while scanning a predetermined range in a one-dimensional or two-dimensional direction;

light-receiving means which has a predetermined directivity and receives incident light including pulsed reflection light reflected in each scanning direction by said object;

distance measurement means for calculating, based on the time from the sending of said pulsed light to the receiving of said incident light and based on said scanning direction, a direction of said incident light and also the distance to said object in said direction of said incident light as distance data; and interference detection means which has a second predetermined directivity different from said predetermined directivity of said light-receiving means, scans the scan range to receive second incident light not including said pulsed reflection light, and determines whether interference light exists, based on said second incident light.

20. The distance measurement device as set forth in claim 19, which further comprises data invalidation means which stores a direction of said second incident light as second incident light direction data, calculates an incident direction of interference light based on the stored second incident light direction data, when said interference detection means determines that interference light exists, and makes invalid the distance data corresponding to said incident direction of interference light.

21. The distance measurement device as set forth in claim 17 or 19, which further comprises distance data replacement means for replacing distance data made invalid when said interference detection means determines that interference light exits, with distance data in the incident direction of interference light at the time of a previous scan.

22. The distance measurement device as set forth in claim 17 or 19, which further comprises distance data interpolation means which calculates distance data of the incident direction of interference light based on distance data of a direction adjacent to the incident direction of interference light, when said interference detection means determines that interference light exits, and replaces the distance data made invalid with the calculated distance data.

23. A distance measurement device comprising:

light-sending means for sending pulsed light toward an object of measurement where a distance thereto is measured, at the light-sending timing synchronized with a clock pulse;

light-receiving means for receiving incident light including pulsed reflection light reflected by said object;

distance measurement means for measuring the time from the sending of said pulsed light to the receiving of said incident light and calculating the distance to said object;

light-sending stop means for stopping the sending of the pulsed light at the next light-sending timing after the distance measurement by said distance measurement means;

interference detection means for determining whether interference light exists; and interference avoidance means for shifting the next light-sending timing and the light-sending timing thereafter, when said interference detection means determines that interference light exists.

24. The distance measurement device as set forth in claim 23, wherein said interference avoidance means delays or quickens said light-sending timing for more than a distance measurement time equivalent to a distance measurable range.

25. The distance measurement device as set forth in claim 23, wherein the time that said interference avoidance means shifts said light-sending timing is an arbitrary value.

26. The distance measurement device as set forth in claim 23, wherein said interference avoidance means shifts said light-sending timing immediately after the light-receiving timing at which said light-receiving means receives interference light.

27. The distance measurement device as set forth in claim 23, wherein said interference detection means detects the incident timing and period of interference light as well as determining whether interference light exists, and said interference avoidance means calculates, based on said incident timing and period of interference light, a chance that interference light overlaps pulsed light within a distance measurement time equivalent to a distance measurable range after said light-sending means sends pulsed light, and delays or quickens the light-sending timing so that interference light does not overlap pulsed light within said distance measurement time equivalent to a distance measurable range after said light-sending means sends pulsed light.

* * * * *